(12) United States Patent
Chao et al.

(10) Patent No.: US 8,248,946 B2
(45) Date of Patent: Aug. 21, 2012

(54) PROVIDING A HIGH-SPEED DEFENSE AGAINST DISTRIBUTED DENIAL OF SERVICE (DDOS) ATTACKS

(75) Inventors: Hung-Hsiang Jonathan Chao, Holmdel, NJ (US); Huizhong Sun, Brooklyn, NY (US)

(73) Assignee: Polytechnic Institute of New York Unversity, Brooklyn, NY (US)

( * ) Notice: Subject to any disclaimer, the term of this patent is extended or adjusted under 35 U.S.C. 154(b) by 1026 days.

(21) Appl. No.: 11/447,676

(22) Filed: Jun. 6, 2006

(65) Prior Publication Data

US 2007/0280114 A1    Dec. 6, 2007

(51) Int. Cl.
*H04L 1/00*     (2006.01)
*H04L 12/54*    (2006.01)

(52) U.S. Cl. ............... 370/235.1; 370/412; 370/428
(58) Field of Classification Search ........... 370/229, 370/235.1; 709/223
See application file for complete search history.

(56) References Cited

U.S. PATENT DOCUMENTS

| | | | |
|---|---|---|---|
| 6,208,622 B1 * | 3/2001 | Makrucki | 370/252 |
| 6,327,246 B1 * | 12/2001 | Jones | 370/232 |
| 6,578,082 B1 * | 6/2003 | Ho et al. | 709/233 |
| 6,748,063 B1 * | 6/2004 | Hunt et al. | 379/112.04 |
| 7,707,305 B2 * | 4/2010 | Afek et al. | 709/238 |
| 2002/0083175 A1 * | 6/2002 | Afek et al. | 709/225 |
| 2003/0076848 A1 * | 4/2003 | Bremler-Barr et al. | 370/412 |
| 2004/0054924 A1 * | 3/2004 | Chuah et al. | 713/201 |
| 2005/0111367 A1 * | 5/2005 | Jonathan Chao et al. | 370/235 |
| 2008/0212597 A1 * | 9/2008 | Baryshnikov et al. | 370/408 |

OTHER PUBLICATIONS

Christopher Kruegel 10th Acm/Ccs, pgs. and Giovanni Vigna, "Anomaly Detection of Web-based Attacks," 251-261 (Oct. 27-31, 2003).
Mooi Choo Chuah, Wing Cheong Lau, Yoohwan Kim Performance of PacketScore for blocking DDoS attacks," pgs. 1892-1896 (2004). and H. Jonathan Chao, "Transient IEEE Communications Society,. Yoohwan Kim, Wing Cheong Lau, Mooi "PacketScore: Statistics-based Overload Attacks," IEEE Infocom 2004, 11 pgs Choo Chuah and H. Jonathan Chao, Control against Distributed Denial-of-Service (Apr. 2004).

* cited by examiner

*Primary Examiner* — Andrew Chriss
*Assistant Examiner* — Robert A Shand
(74) *Attorney, Agent, or Firm* — John C. Polotylo; Straub & Pokotylo

(57) ABSTRACT

Effective control of communications traffic, even under fast-changing DDoS attacks, might be performed by (a) determining parameters of a leaky bucket using nominal communications traffic, (b) applying current communications traffic to the leaky bucket, (c) observing overflows, if any, of the leaky bucket, (d) scoring the current traffic based on the observed overflows, and (e) passing or dropping traffic based on the score. Alternatively, such control might be performed by (a) determining average mean and variance of each of one or more attribute values of nominal communications traffic, (b) determining a mean of each of the one or more attribute values of current communications traffic, (c) determining a probability that for each of the one or more attributes, its current mean value deviates more from its average mean that its current attribute value, (d) scoring the current traffic based on the determined probability or probabilities, and (e) passing or dropping traffic based on the score.

23 Claims, 18 Drawing Sheets

PROVIDING A HIGH-SPEED DEFENSE AGAINST DISTRIBUTED DENIAL OF SERVICE (DDOS) ATTACKS

§1. BACKGROUND

§1.1 Field of the Invention

The present invention concerns Internet security. More specifically, the present invention concerns defending against distributed denial of service (DDoS) attacks on networks.

§1.2 Background Information

§1.2.1 Defense Systems for DDoS Attacks

DDoS attacks aim to interrupt localized Internet services by making them temporarily unavailable by flooding the victim (a single Web host or an entire stub network served by an ISP) with a high volume of legitimate malicious packets originating from many different sources. To stop DDoS attacks, while they are in course, without manual identification, characterization, and filter configuration on ISP routers, methods based on marking and traceback protocols (See, e.g., S. Bellovin, M. Leech, and T. Taylor, "ICMP Traceback Messages," draft-ietf-itrace-01.txt, Internet draft, October 2001; and A. Yaar, A. Perrig, and D. Song, "FIT: Fast Internet Traceback," *IEEE Infocom*, March 2005.) and pushback mechanisms (See e.g., J. Ioannidis and S. M. Bellovin, "Implementing Pushback: Router-Based Defense Against DDoS Attacks," *Network and Distributed System Security Symp.*, February 2002; and D. K. Y. Yau, J. C. S. Lui, and F. Liang, "Defending Against Distributed Denial-of-Service Attacks with Max-min Fair Servercentric Router Throttles," *IWQoS*, 2002) have recently been proposed. Intrusion pattern recognition has also been proposed by the data mining community to automate extraction of hidden predictive information from databases, including offline machine-learning approaches (See, e.g., W. Lee and S. J. Stolfo, "Data Mining Approaches for Intrusion Detection," *the 7th USENIX Security Symp.*, January 1998; and D. Marchette, "A Statistical Method for Profiling Network Traffic," *the 1st USENIX Workshop on Intrusion Detection and Network Monitoring*, April 1999) and online as is the D-WARD approach (See, e.g., J. Mirkovic, G. Prier, and P. Reiher, "Attacking DDoS at the Source," *ICNP*, November 2002). A combination of static and dynamic statistical filters has also been proposed in (See, e.g., Q. Li, E. C. Chang, and M. C. Chan, "On the Effectiveness of DDoS Attacks on Statistical Filtering," *IEEE Infocom*, March 2005).

There are also commercial products such, as Asta Networks and Cisco (See, e.g., Asta Networks Inc., http://www.astanetworks.com; and Cisco NetRanger Overview, http://www.cisco.com/univercd/cc/td/doc/product/iaabu/csids/csids1/csidsug/overview.htm), that detect and mitigate specific types of known DDoS attacks, especially those generated by well-known DDoS attack tools. However, their signature-based approach makes them vulnerable for new types of DDoS attacks. Arbometworks' product (See, e.g., Arbornetworks Com., http://www.arbometworks.com) mitigates DDoS attacks with the traceback approach, requiring the precise characterization of the attacking packets. Mazu, Riverhead (currently Cisco) and Cyberoperations products (See, e.g., Mazu Networks Inc., http://www.mazunetworks.com; and Cyber-operation Com., http://www.cyberoperations.com) are built on statistics-based adaptive filtering techniques. Most of these solutions do not fully automate packet differentiation and discarding. Instead, they only recommend a set of binary filter rules to the network administrator.

It would be useful to provide a DDoS defense system that is flexible enough to cope with new and more sophisticated attacks in the future, and that offers online automated approaches that are more scalable in terms of network operating speed and the number of potential targets to be protected. PacketScore, (See, e.g., Y. Kim, W. C. Lau, M. C. Chuah, and H. J. Chao, "PacketScore: Statistics-based Overload Control against Distributed Denial of Service Attacks," *IEEE Infocom*, April 2004), proposes a statistics-based overload control approach that efficiently addresses key scalability issues in a backbone implementation, allowing a large number of targets to be protected at high speed. It is a proactive defense system by nature, able to detect and block never-seen-before attacks. Essentially, it detects and filters DDoS attacks based on a packet-scoring approach. Arriving packets are given scores based on their packet attribute values (in IP, TCP or UDP header) as compared to nominal traffic profiles, and selectively discarded if their scores are below a dynamic threshold.

Although PacketScore is promising, it would be useful to provide improved packet scoring schemes. For example, it would be useful to lower implementation complexity, increase attack detection and differentiation accuracies, and increase adaptability against complex DDoS attacks.

§1.2.1.1 Perceived Limitations of the Current CLP-Based Packetscore Scheme

Here, the previously proposed PacketScore scheme is reviewed. FIG. 5 depicts the support of distributed detection and overload control by multiple Detecting-Differentiating-Discarding Routers (3D-Rs) 510 on a defense perimeter and DDoS Control Servers (DCSs) 530/540. Let n be the total number of 3D-Rs along the defense perimeter. The use of DCS 530/540 reduces the peer communications from 3D-Rs $O(n^2)$ to $O(n)$, and spares the 3D-Rs 510 from the burden of managing a large number of per-end-point-target nominal traffic profiles. Since a DCS 530/540 exchanges only control messages with the 3D-Rs 510, it can be safely kept away from the normal data path (out of the reach of potential DDoS attack traffic). To facilitate load balancing and improve scalability, the set of potential end-point targets within a domain can be partitioned among multiple DCSs 530/540.

The PacketScore scheme uses a statistic-based Bayesian method called Conditional Legitimate Probability (CLP) to calculate packets' scores, (hereinafter referred to as "the CLP-based scheme"). It consists of the following three phases. First, an attack detection and victim identification phase might be performed by monitoring four key traffic statistics of each protected target (packets-per-second, bits-per-second, number of active flows, and new arriving flow rate) while keeping minimum per-target states. The key traffic parameters are compared to the nominal traffic profile parameters. A DCS 530/540 aggregates the reports from multiple 3D-Rs 510 on a defense perimeter, to confirm if there is actually an ongoing attack.

A second phase might differentiate attacking packets from legitimate ones by giving a score to every packet destined to the identified victim. Scores are determined by comparing every packet's current traffic profile against its nominal traffic profile. More specifically, they are computed by CLP, and stored in the form of scorebooks. By this method, the attribute value shared by attacking (legitimate) packets will be assigned a lower (higher) score, because of its relative frequency increase (decrease) in current traffic profile against the nominal ones. As a result, PacketScore can efficiently differentiate legitimate packets among suspicious traffic.

Third, packets might be discarded selectively by comparing the packet's score with a dynamic threshold, which is adjusted according to (1) the score distribution of all suspicious packets and (2) the congestion level of the victim.

In a PacketScore scheme, each arriving packet obtains a set of partial scores from a scorebook via a lookup operation, according to the attribute values it carries. The packet score—the sum of the packet's partial scores—is then compared to a dynamic threshold in an overload control unit. Packets whose scores are less than the threshold will be discarded.

A nominal profile is a set of baselines collected during a period in which the protected network was allegedly free of attacks. It characterizes the traffic within a certain period of time by measuring the average throughput in packets or bytes per second (used to rule an acceptable output packet rate), and by creating packet attributes normalized histograms. A measured profile has also this same structure, but characterizes the online traffic instead.

The comparison of both profiles provides PacketScore with enough parameters to distinguish legitimate packets from DDoS attacking packets with the use of a metric or score. The degree of disassociation existing between these profiles (the higher the disproportion, the higher the likelihood of an attack) provides packet differentiation.

The following attributes are currently measured on both profiles to generate the histograms: IP protocol-type values, packet sizes, Time-to-Live (TTL) values, Server port number, 16-bit source/destination IP address prefixes (as an approximation to the IP subnet calculation), TCP/IP header length, and TCP flag patterns.

Iceberg-style histograms (See, e.g., B. Babcock et al., "Models and Issues in DataStream Systems," *ACM Symp. on Principles of Database Sys.*, June 2002.), are used so that the nominal profile includes only the non-null attribute values (icebergs) that appear more frequently than a preset threshold, say x %. This keeps the profile to a manageable size, and reduces the lookup time. Iceberg-style histograms require two passes of input data to collect nominal profile data. A one-pass iceberg-style histogram maintenance/update is implemented efficiently in hardware by applying a two-stage pipelined approximation similar to what is proposed in R. M. Karp, C. H. Papadimitriou, and S. Shenker, "A Simple Algorithm for Finding Frequent Elements in Streams and Bags," *ACM Trans. on Database Systems*, Volume 28, Issue 1, pp. 51-55, March 2003.

In this method, data processing is divided into periods where period t−1 scans for icebergs to be accounted in period t, which also scans for icebergs to be used in period t+1 and so on as in FIG. 6. FIG. 6 contains real attribute values and frequencies from the flag nominal profile, using a 1% threshold. Arriving packets in period t−1 possessed flag attribute values 2, 16, 17, 18, 20, and 24. These values (or icebergs) are accounted in period t, with the number of occurrences being 2335, 3850, 154, 88, 101, and 991, respectively. At the same time, in period t, arriving packets have flag attribute values 2, 16, 17, 19, 22, and 24, composing the icebergs to be accounted in period t+1.

Scoring is obtained as a direct comparison of nominal and measured profiles using CLP as a metric. After the scores are computed, it is necessary to calculate which score represents an upper-bound threshold that will distinguish legitimate packets from attacking ones, in a per packet/per-score basis. This chosen score will attend to throughput requirements, which regulate the output throughput, keeping it close to a target throughput previously set.

This overload control process is achieved by having a Cumulative Distribution Function (CDF) of all incoming packets created and maintained using one-pass quantile computation techniques as in (See, e.g., F. Chen, D. Lambert, and J. C. Pinheiro, "Incremental Quantile Estimation for Massive Tracking," *6th International Conference in Knowledge Discovery and Data Mining*, August 2000; and M. Greenwald and S. Khanna, "Space-Efficient Online Computation of Quantile Summaries," *In Proceedings of the* 2001 *ACM SIGMOD International Conference on Management of Data*, May 2001). Next, the discarding threshold (THd) is calculated (and dynamically adjusted) using the load-shedding algorithm as in (See, e.g., S. Kasera, J. Pinheiro, C. Loader, M. Karaul, A. Hari, and T. LaPorta, "Fast and Robust Signaling Overload Control," *Proceedings of 9th International Conference on Network Protocols* (*ICNP*), November 2001).

According to this algorithm, the congestion level of the victim is measured, allowing the victim system to opportunistically accept more potentially-legitimate traffic as its capacity permits. As shown in FIG. 7, the resulting $TH_d$ 705 is simply a discarding threshold associated to a corresponding drop rate. Incoming packets having packetscore are below the $TH_d$, 705 are discarded. The key idea here is to prioritize and drop packets based on their score values.

In the CLP-based scheme, a scorebook, a collection of each attribute value's score, is first generated based on Bayesian CLP. The score associated with each attribute value is obtained from two histograms; one is the currently measured and the other is the nominal profile. Implementation complexity arises from the calculation of these two histograms for each packet attribute.

It is very challenging to provide an effective overload control when a system is under fast-changing DDoS attacks. The previously proposed PacketScore scheme uses a CDF and a load-shedding algorithm to generate the discarding threshold $TH_d$. Packets with scores lower than the threshold are discarded. However, if an attacker changes its attack type and intensity, the $TH_d$—which was valid for a certain range of scores—would very likely become invalid, therefore compromising the differentiation capacity, until a more adequate $TH_d$ is dynamically set. This situation tends to worsen as the scores of a measurement period are used in the next period, while the attacks continue to change.

It has been observed that the moment the attacks change, spikes of admitted traffic appear (due to the threshold invalidation explained above), sometimes lasting for a relatively large period of time. Even with frequent threshold updates in a small period of time, (the only way to revalidate the threshold), the CLP scheme still suffers from this problem. Thus, it would be useful to provide effective control even under fast-changing DDoS attacks.

§2. SUMMARY OF THE INVENTION

Embodiments consistent with the present invention provide effective control of communications traffic even under fast-changing DDoS attacks. Some embodiments consistent with the present invention might do so by (a) determining parameters of a leaky bucket using nominal communications traffic, (b) applying current communications traffic to the leaky bucket, (c) observing overflows, if any, of the leaky bucket, (d) scoring the current traffic based on the observed overflows, and (e) passing or dropping traffic based on the score. Other embodiments consistent with the present invention might provide effective control of communications traffic even under fast-changing DDoS attacks by (a) determining average mean and variance of each of one or more attribute values of nominal communications traffic, (b) determining a mean of each of the one or more attribute values of current communications traffic, (c) determining a probability that for each of the one or more attributes, its current mean value deviates more from its average mean that its current attribute value, (d) scoring the current traffic based on the determined probability or probabilities, and (e) passing or dropping traffic based on the score.

§3. BRIEF DESCRIPTION OF THE DRAWINGS

§4. DETAILED DESCRIPTION

The present invention may involve novel methods, apparatus, message formats, and/or data structures for improving the security of networks. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

In the following, §4.1 presents the motivations and advantages of the new schemes. §4.2 and §4.3 describe the implementation of the proposed Leaky-Bucket and Attribute-Value-Variance (AV) based scoring schemes, respectively. Section 4.4 describes the use of a new overload control and dynamic threshold adjustment system.

§4.1 Overview

Figure 1:
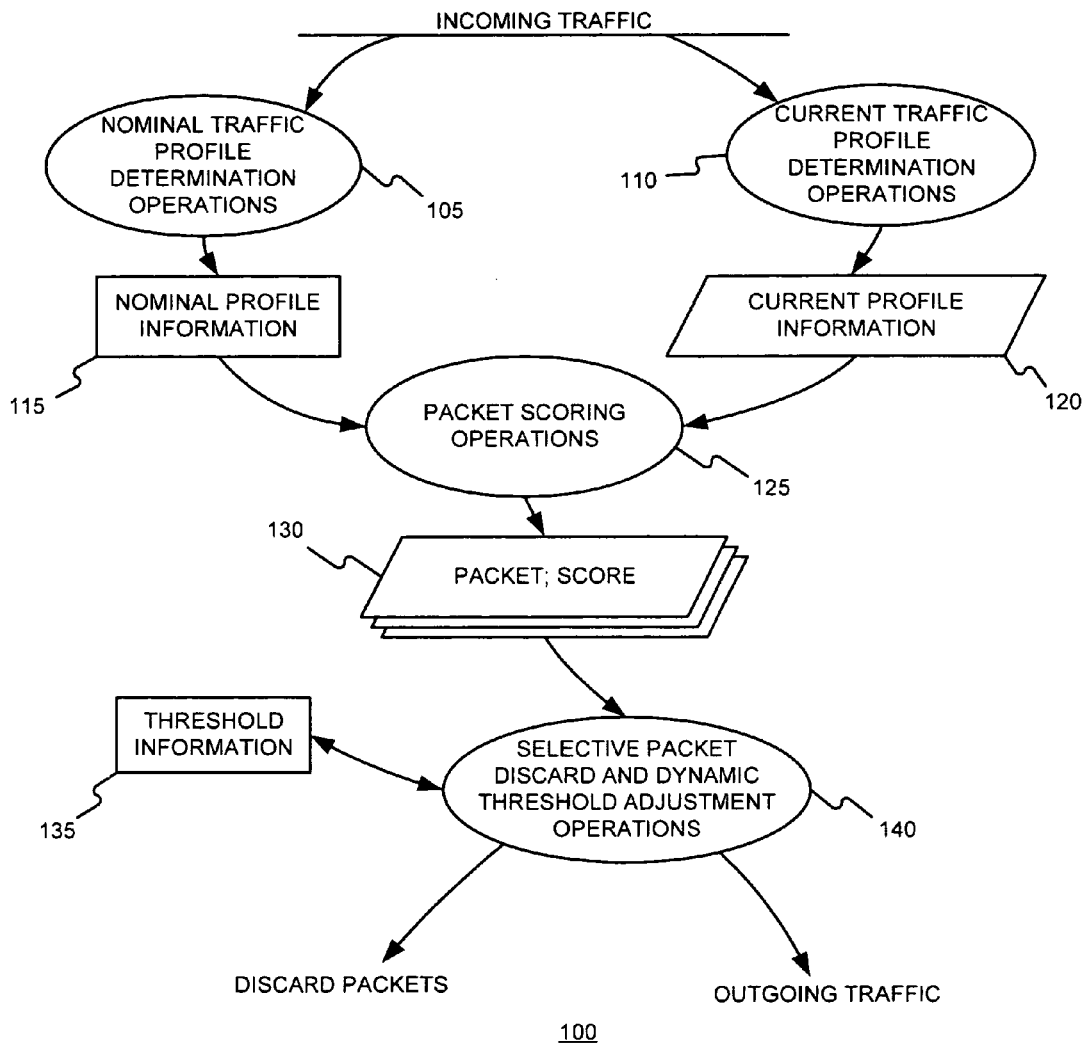
FIG. 1 is a bubble diagram illustrating operations that may be used, as well as information that may be processed, generated, and/or stored, a packet scoring scheme in a manner consistent with the present invention.

FIG. 1 is a bubble diagram illustrating operations that may be used as well as information that may be processed, generated, and/or stored in a packet scoring scheme consistent with the present invention. In particular the packet scoring scheme environment 100 may include nominal traffic profile determination operations 105, current traffic profile determination operations 110, packet scoring operations 125, and selective packet discard and dynamic threshold adjustment operations 140. The nominal traffic profile determination operations 105 may determine nominal traffic profile information 115 which is then provided to the packet scoring operation 125. The current traffic profile determination operations 110 may determine current traffic profile information 120 which is then provided to the packet scoring operations 125. The packet scoring operations 125 may determine scores 130 for packets of the current traffic profile information 120 based on nominal profile information 115. The packets with their associated scores 130 are then provided to the selective packet discard and dynamic threshold adjustment operations 140 where the scored packets are analyzed with respect to threshold information 135. Packets determined to be a DDoS type attack are discarded, while others are forwarded.

The nominal traffic profile determination operations 105 are responsible for sampling incoming traffic to a network and building statistical profile information of the packets and their associated attribute values from the sampled network traffic. This is done to assess the type and nature of traffic nominally coming into the network.

The current traffic profile determination operations 110 are also responsible for sampling incoming traffic to a network and building statistical profile information of the packets and their associated attribute values from the sampled network traffic. Again this is done to assess the type and nature of traffic currently coming into the network.

The packet scoring operations 125 may accept the nominal traffic profile 115 and current traffic profile information 120 and are responsible for examining and assigning a score for each packet of the current traffic 120 based on the nominal traffic profile information 115. By doing so, each packet of the current traffic 120 entering into a network may have an associated score 130. Of course, the packet scoring operations 125 may use various methods of scoring such as the Leaky-Bucket-based scoring and the Attribute-value-variation scoring described below. The packet-score results may then be sent to selective packet discard and dynamic threshold adjustment operations 140.

The selective packet discard and dynamic threshold adjustment operations 140 may accept packet-score information 130 and well as threshold information 135. The selective packet discard and threshold adjustment operations 140 are responsible for determining and discarding suspicious packets—e.g., those that are considered to be of a DDoS attack. By means of the score of each packet and the threshold information, the operations 140 can selectively discard packets with scores above the threshold. The packets with scores above the threshold are considered to be suspicious (e.g., part of a DDoS attack). Hence, such packets are discarded (e.g., prevented from entering the network). Further, the threshold information 135 available to the 140 operations may be dynamically adjusted by the operations 140 to accommodate changes in the nature and behavior of incoming traffic so as to prevent the discarding of legitimate packets, and/or to combat fast changing DDoS attacks to a network. As described below, the threshold might be dynamically adjusted using a proportion integration control system.

Figure 2:
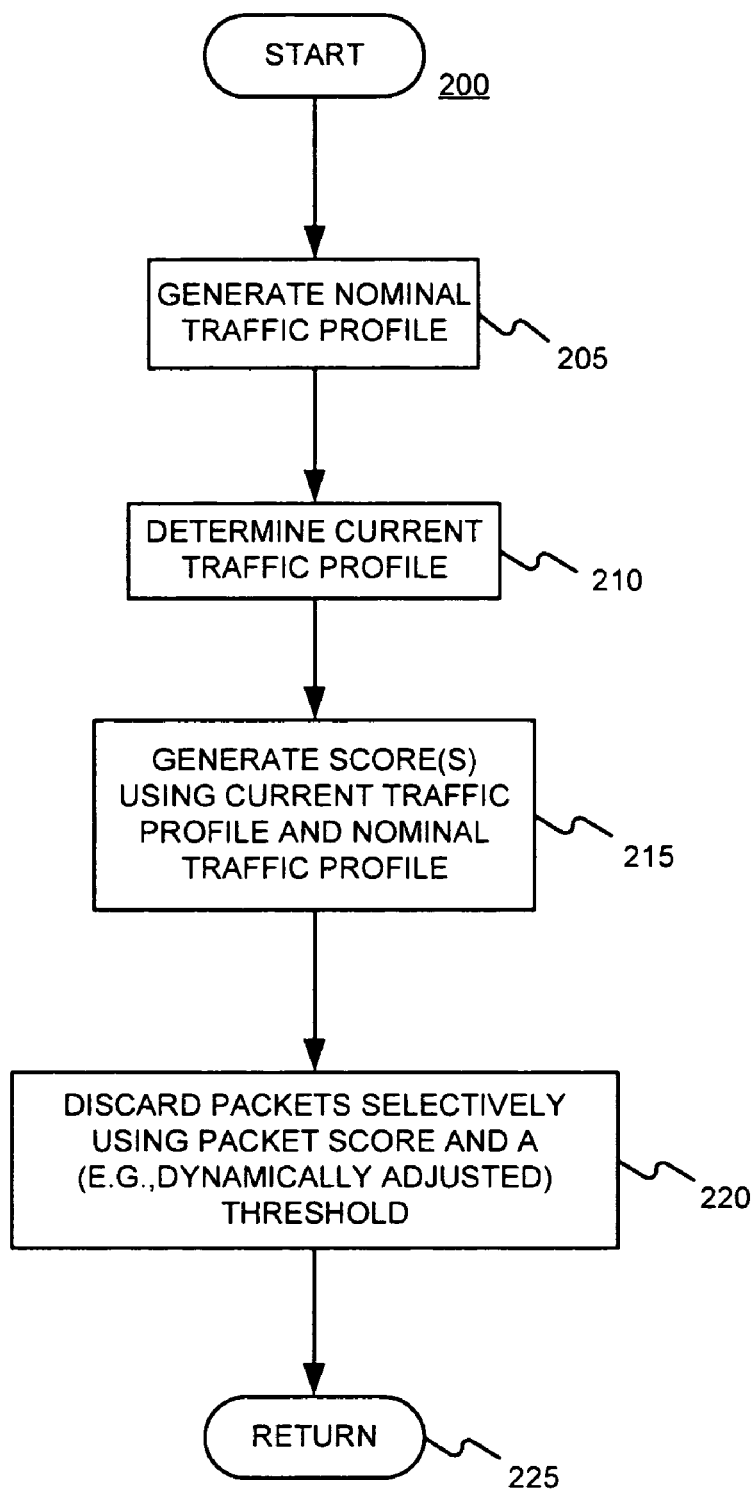
FIG. 2 is a flow diagram illustrating an exemplary method for discarding packets according to a packet scoring scheme consistent with the present invention.

FIG. 2 is a flow diagram illustrating an exemplary method 200 for discarding packets according to a packet scoring scheme consistent with the present invention. In particular, the method 200 may generate nominal traffic profile information (Block 205) and determine the current traffic profile information of the network (Block 210). Subsequently, the method 200 may generate score(s) using the current traffic profile and nominal traffic profile information (Block 215). The method 200 may then discard packets selectively using packet scores and a (e.g., dynamically adjusted) threshold (Block 220) before it is left (Node 225).

Referring back to block 205, the method 200 may generate nominal traffic profile information that include statistical information that describes the nature and behavior of traffic entering into a network. The nominal traffic profile information may be updated periodically in order to accommodate possible expected (non-suspicious) changes in traffic behavior.

Embodiments consistent with the present invention provide new methods to replace the prior art CLP-based scheme to achieve high-speed operations, e.g., 10 Gbps.

A first embodiment consistent with the present invention provides a Leaky-Bucket (LB) based scheme which does not need to calculate a measured profile histogram, and which does not need to calculate any kind of histogram in real-time. Instead, it assigns an LB for each attribute value and determines a score for each attribute value which is a function of the number of overflows of the associated LB. The scorebook can be readily obtained by keeping track of the overflow counts. The operation of the LB-based scheme is quite simple, only involving memory access and count value updates. LB-based schemes are described in §4.2 below.

A second embodiment consistent with the present invention provides a scheme—called Attribute-Value-Variation (AV)—which improves the accuracy of packet discarding (the capacity to distinguish legitimate packets from attacking packets, and discard the attacking ones with as much accuracy as possible), as compared to the CLP-based and LB-based schemes. This is achieved by using an attribute value variance instead of simple attribute values as an LB-based scheme threshold. AV is less complex than the CLP-based scheme, but more complex than the LB-based scheme. The complexity comes from calculating the variance for each attribute value during the nominal profile.

As an alternative solution to the problem of fast changing DDoS attacks, embodiments consistent with the present invention might use a Proportion Integration (P/I) control. The overall control system is simpler than the CDF/load-shedding scheme, with lower computational and memory requirements. Further, P/I provides a higher degree of independence from the scores generated in the previous period, and adapts faster to new attacks than the CDF/load-shedding scheme.

Figure 3:
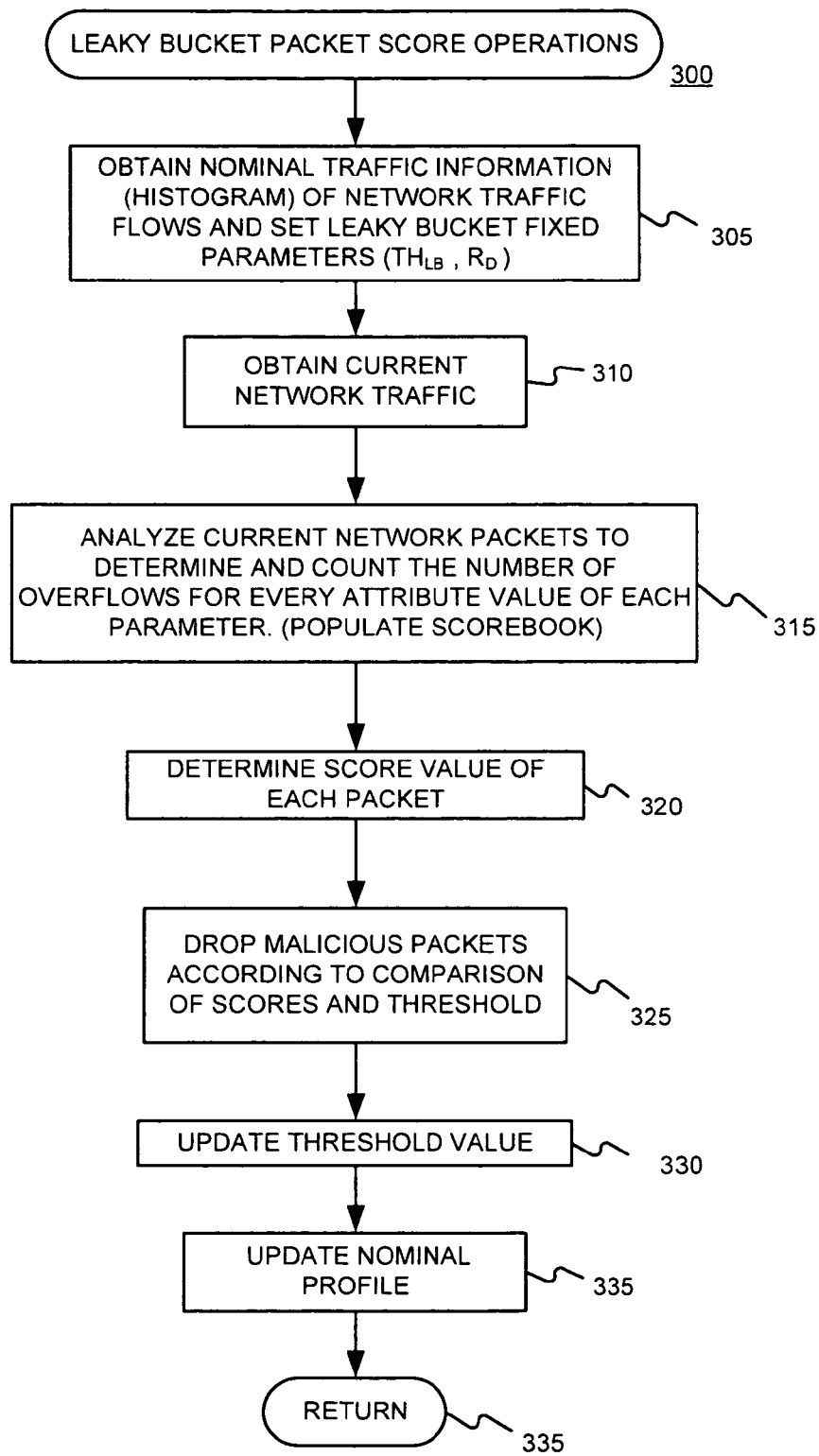
FIG. 3 is a flow diagram illustrating an exemplary method for discarding packets according to a leaky-bucket packet scoring scheme consistent with the present invention.

§4.2 Leaky-Bucket Packet Scheme Consistent with a First Embodiment of the Present Invention §4.2.1 Exemplary Methods FIG. 3 is a flow diagram illustrating an exemplary method 300 for discarding packets according to a leaky-bucket packet scoring scheme consistent with the present invention. Specifically, the method 300 may generate or obtain nominal traffic information (histogram) of network traffic flows and set leaky bucket fixed parameters (size: $TH_{LB}$, drain rate: $R_D$) (Block 305). Further, the method 300 may obtain current network traffic information. (Block 310) Subsequently, the method 300 may proceed to analyze the current network packets in order to determine and count the number of leaky bucket overflows for every attribute value of each packet (populate scoreboard). (Block 315) The method 300 may then determine a score value for each packet and compare it with the system's established threshold so as to drop malicious packets according to this threshold. (Blocks 320 and 325). Next, the method 300 may update the threshold as well as the nominal traffic profile information, if necessary (Block 330 and 335), before the method 300 is left (Node 335)

Referring back to block 305, the method 300 may construct nominal profile information (e.g., a histogram) for each attribute value of the packets. By doing so, as will be seen clearly in the following sections, the method 300 may set the leaky-bucket's size and drain rate which are parameters defining of the leaky-buckets of each attribute value. The buckets size is also called $TH_{LB}$ (leaky-bucket threshold) and the drain rate is represented by $R_D$.

Referring back to block 315, the method 300 may analyze the current network packets by determining and counting the number of overflows for every attribute of each packet. Doing so allows the method 300 to calculate score values for every packet. Subsequently, the method 300 may drop malicious packets by comparing their score values against the current systems threshold.

§4.2.2 Refinements and Alternatives of Leaky-Bucket Scheme

LB is well-known traffic enforcement/shaping algorithm and is usually implemented at the network edges to ensure a user's traffic complies with the negotiated traffic parameters. Conceptually, an LB consists of a bucket with a size of S and a drain rate of $R_d$. In the context of traffic control, arriving packets are considered non-conforming if they will cause the bucket to overflow. They can be either discarded (for enforcement) or delayed (for shaping).

The notation $A_{ij}$ is introduced to represent a particular TCP/IP attribute value. In this case, i is an index that uniquely identifies a TCP/IP attribute, while j represents the value of this TCP/IP attribute i. Attribute value $A_{1,26}$ for example, could represent TTL=26, $A_{2,80}$ could represent Server Port=80 (HTTP), $A_{3,64}$ could represent Packet Size=64, etc.

In at least some embodiments consistent with the present invention, an LB is maintained for each attribute value $A_{i,j}$, with a given size and a drain rate that are derived from the histogram of attribute $A_{i,j}$ in the nominal profile. By measuring the LB overflow frequency (more precisely, the overflow count in a measurement period), how discrepant the measured-traffic and nominal profiles are can be determined. This overflow frequency is regarded as a partial score for the associated attribute value. The total score of the arriving packet destined to the identified victim, a server or network under DDoS attack, is the sum of all partial scores. The bucket size S is determined as follows:

$$S = N \cdot f(A_{i,j}) \cdot c \qquad (1)$$

where N is the number of incoming packets during a measurement period for nominal traffic, c is a constant as the mark of measurement (e.g., 10%) and $f(A_{i,j})$ is the distribution frequency of an attribute value $A_{i,j}$. Both N and $f(A_{i,j})$ are obtained from the nominal profile, and the drain rate $R_d$ of the LB associated with attribute value $A_{i,j}$ can be obtained by $R_d = N \cdot f(A_{i,j})/T$, where T is the measurement period (in second) of LB for measuring current traffic.

Leaky-Bucket-Based Scoring

One embodiment of LB-based packet scoring, consistent with the present invention, is now described. Consider all the packets destined for an identified victim, a server or network under DDoS attack. A packet, p, carries a set of discrete-valued attributes $A_i^p$, where $A_1^p$ could be the TTL value (e.g. TTL=26 or $A_{1,26}$), $A_2^p$, the server port number, $A_3^p$, the packet size in bytes, and so forth up to $A_n^p$, where n is the number of attributes. Let $V(A_i^p)$ be the number of overflows of the LB associated with $A_i^p$. The packet score, Score (p), might be defined as the sum of overflows of all packet attribute values:

$$\text{Score}(p) = \sum_{i=0}^{n} V(A_i^p) \qquad (2)$$

Figure 5:
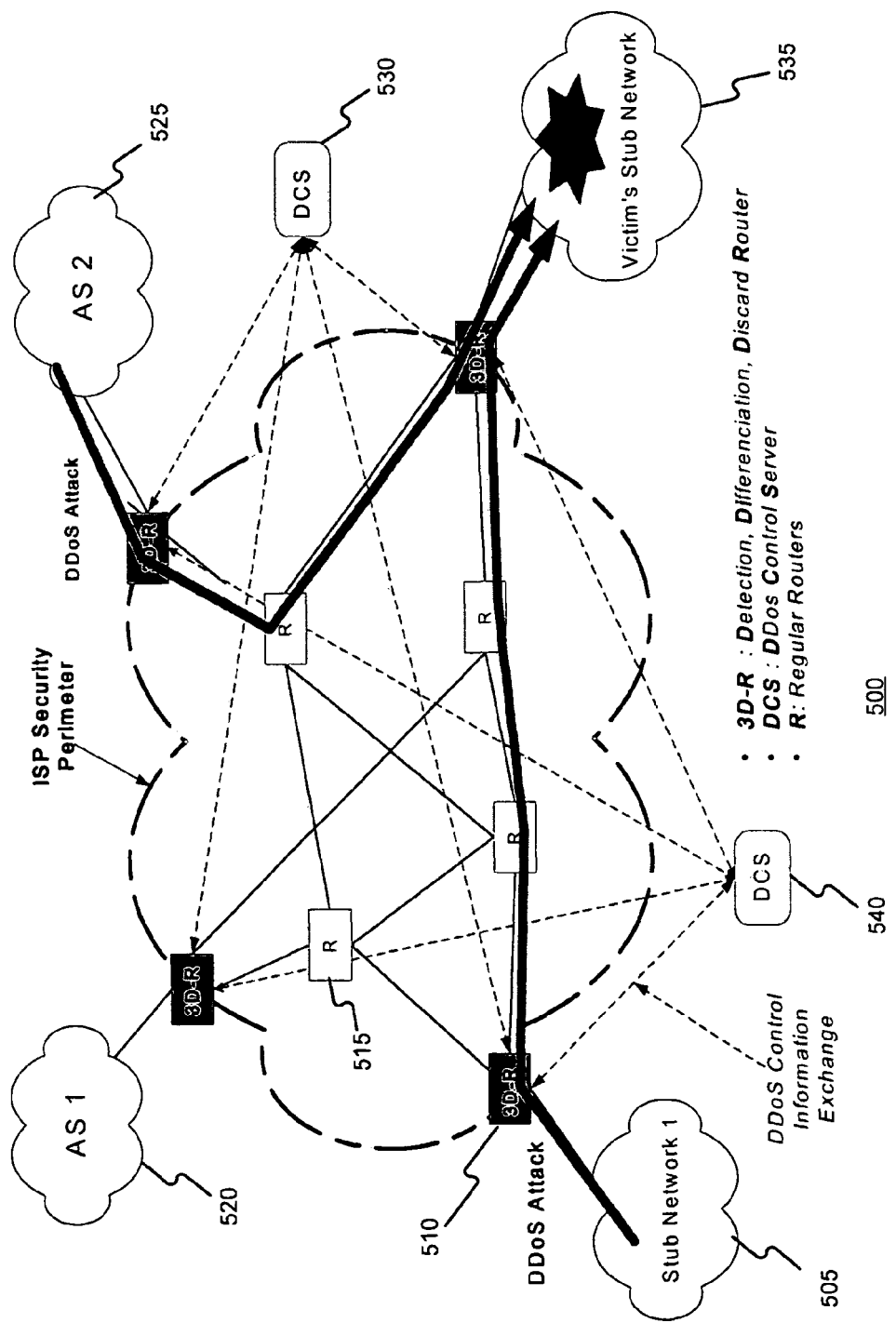
FIG. 5 illustrates the deployment of 3D-Rs and DCSs utilizing the CLP-based packet scoring scheme for coping with end point DDoS attacks in a manner consistent with the present invention

Nominal profiles are maintained by the 3D-Rs (Recall 510 of FIG. 5.), in a way that every endpoint has its own set of nominal profiles. They include a series of Leaky-Bucket sizes obtained from the histograms of nominal profiles of packet attribute values, and throughput information—the number of packets per second. They are maintained by the 3D-Rs (Recall 510 of FIG. 5.) having been collected during a period where the network operated allegedly free from attacks. (It is assumed that relative distribution samples of real-life Internet traffic attributes do not vary significantly over a short period of time, unless there is an attack (a claim corroborated in Y. Kim, W. C. Lau, M. C. Chuah, and H. J. Chao, "PacketScore: Statistics-based Overload Control against Distributed Denial of Service Attacks," *IEEE Infocom*, April 2004, and in simulations).

As a direct application of the iceberg-style histograms, CLP-based nominal profiles do not include attribute values with frequencies below the preset threshold during the measurement interval. The present inventors believe that overall DDoS attack detection would benefit from an increased granularity for these less-frequent attribute values. Hence, at least some embodiments consistent with the present invention extend the iceberg-style histogram concept, in the LB approach. In such embodiments, all attribute values that do not appear so frequently during the measurement interval are grouped in a single entry in a nominal profile histogram, when the sum of their frequencies becomes higher than a preset fixed threshold.

Figure 11:
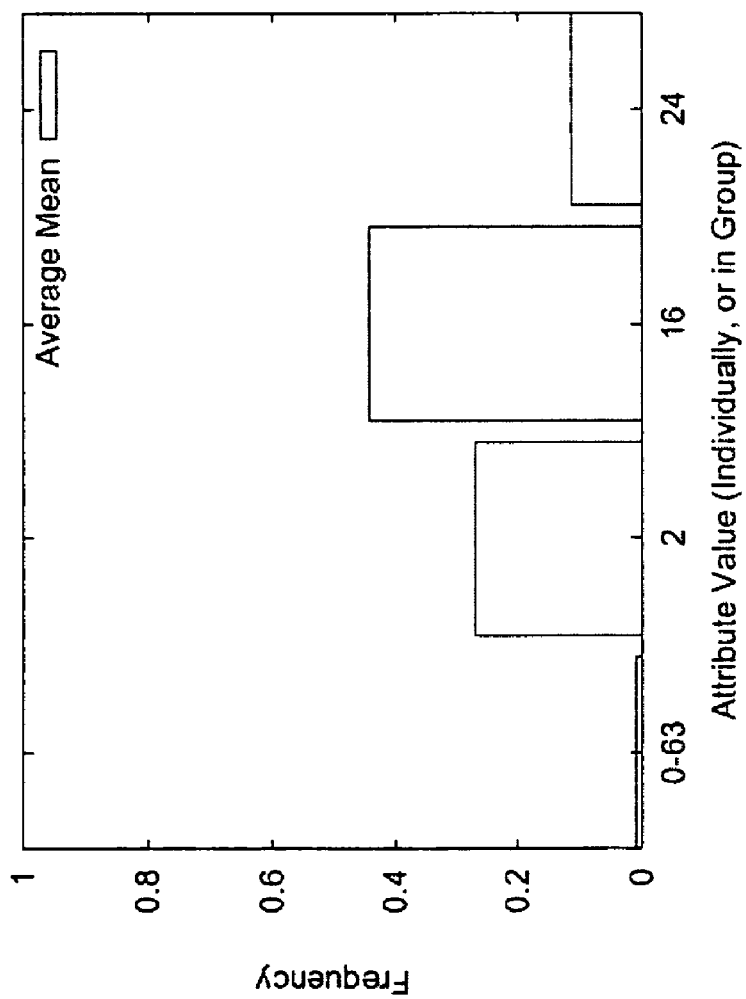
FIG. 11 illustrates a flag nominal profile on the LB-based scheme consistent with the present invention.

FIG. 11 represents the nominal profile histogram for the flag attribute. Its distribution frequencies represent the traffic profile contained in the trace obtained from the Internet trace archive of the MAWI project (MAWI Traffic Archive, http://tracer.csl.sony.co.jp/mawi/) of May 31, 2004, from 2:00 pm to 2:10 pm. Each attribute value has a distribution frequency associated with it. Values 2, 16, and 24, for instance, have distribution frequencies higher than the fixed threshold (set at 1% in the example), while all other attribute values from 0 to 64 (except the three values just mentioned) do not. As a result, these attributes are grouped, sharing the same distribution frequency (like the three single entry values). (In the example, all attribute values below the threshold, coincidently form a single group. However, there can be many groups within a histogram, as long as their joint attribute value frequency is higher than the threshold.) This profile was obtained using special programs that are part of our simulations, and that generate the profiles by reading the data in tcpdump format.

Network traffic observations show different periods of a day across different days having different traffic natures. The nominal profile, therefore, should be periodically updated so as to provide the right nominal profile for the incoming traffic to be measured. It is one function of the 3D-R to provide the profile update, right after the end of each measured nominal period. The period should not be too short. This is because the scoring process could enter into a nominal race condition, always trying to adapt to the recently changed profile, therefore being more sensitive to burstiness. The measured nominal period should not be too long, when the same sensitivity of burst is diminished (and thus not reflecting real traffic very well). Another 3-DR function might be the offline profile generation, which also happens after the end of a period.

Practical observation shows great similarity between icebergs of adjacent periods. Based on this observation, the profile update might be set to take place every 10 minutes, with the last updated profile being used toward score generation (as long as there are no attacks during these periods). When under attack, the profile should not be used by any subsequent period, but should be kept only for post-attack analysis purposes. In that situation, the next profile to be used should be the one from the same period-of-day of the day before, or a week before.

One inherent problem of nominal profiles is the inability to detect unexpected hikes of legitimate nominal traffic throughput within the nominal period. For this situation, a target throughput ($\rho_{target}$) might be set higher than the throughput read from the nominal profile. In this way, more legitimate packets (and also potentially forwarding more attacking traffic as a drawback) are accepted. The $\rho_{target}$ might be dynamic, always higher than the nominal throughput by x % (as long as the final $\rho_{target}$ value doesn't oversubscribe the line or a committed packet rate previously set).

Figure 6:
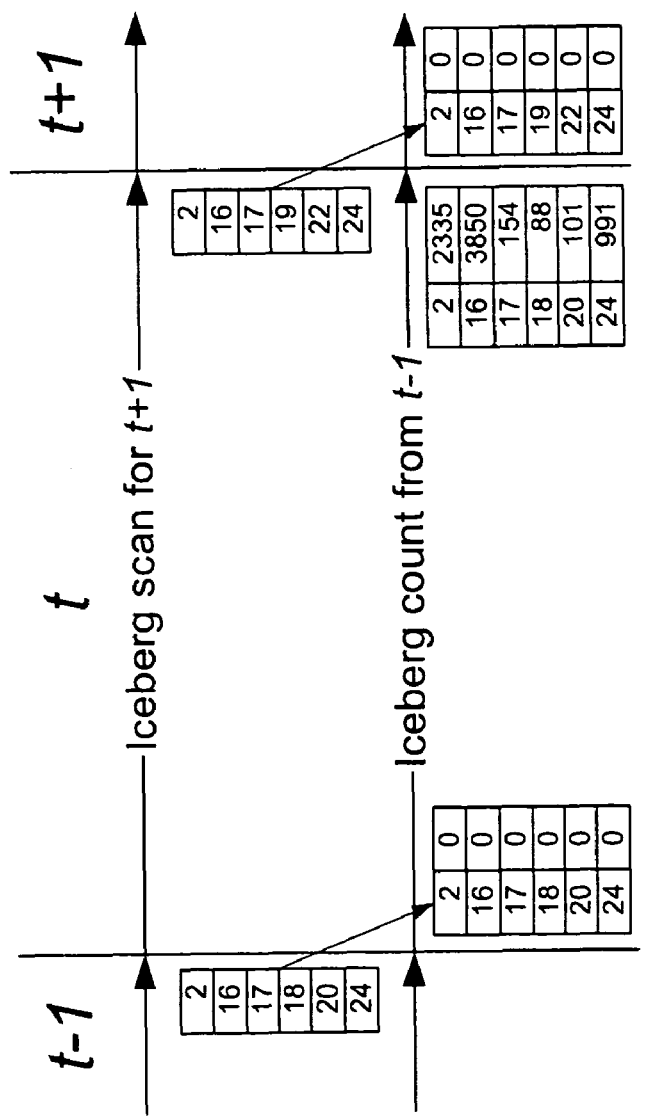
FIG. 6 is a time diagram illustrating iceberg scans for determining iceberg-style histograms of the nominal profile in manner consistent with the present invention.
Figure 7:
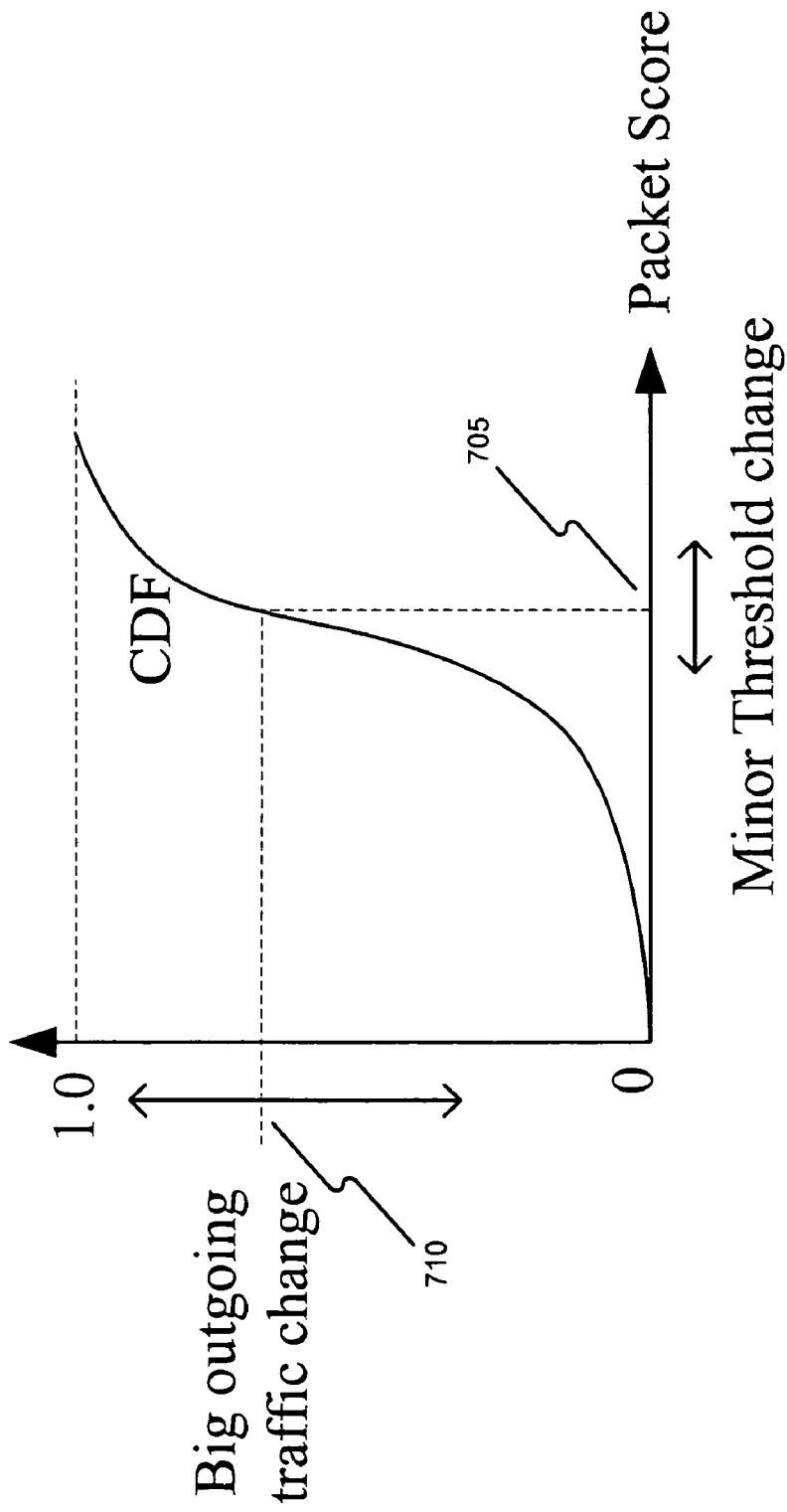
FIG. 7 illustrates a CDF curve used to control the outgoing traffic based on a periodically updated discarding threshold in a manner consistent with the present invention.

As seen in Eq. (2), the packet score is obtained by summing the number of LB overflows of the packet's attribute values. Two processes occur in parallel for this to happen—traffic profiling and score computation. Profiling controls the LB levels and overflows, as in FIG. 6. Scoring might be divided into two parts—the scorebook generation and packet scoring. The scorebook is a set of associations between score and attribute values, containing the latest snapshot of LB overflows. It is periodically updated at the beginning of each traffic profile period, which is a time-scale much longer than the packet arrival time-scale. After the scorebook is built, it is used as a static reference for obtaining the partial scores of an incoming packet, and its further score calculation.

After getting the current traffic profile, the CLP method needs to do a complex offline calculation to generate the scorebook by software, which takes some processing. Unlike Y. Kim, W. C. Lau, M. C. Chuah, and H. J. Chao, "PacketScore: Statistics-based Overload Control against Distributed Denial of Service Attacks," *IEEE Infocom*, April 2004, which requires CLP computation, the scorebook in the LB approach is promptly ready to be used for the next period, with no need of any extra computation.

The following processes should occur in parallel (in the 3D-R) at the time of the packet arrival:
1) Traffic measurement, LB level and overflow controls, histogram update for future generation of the next nominal profile.
2) Scorebook generation at the end of each period.
3) Score computation as a function of the static scorebook and the current packet attribute values.
4) Selective packet discard (overload control), and dynamic threshold adjustments by the Proportion Integration (P/I) control system.

Figure 9:
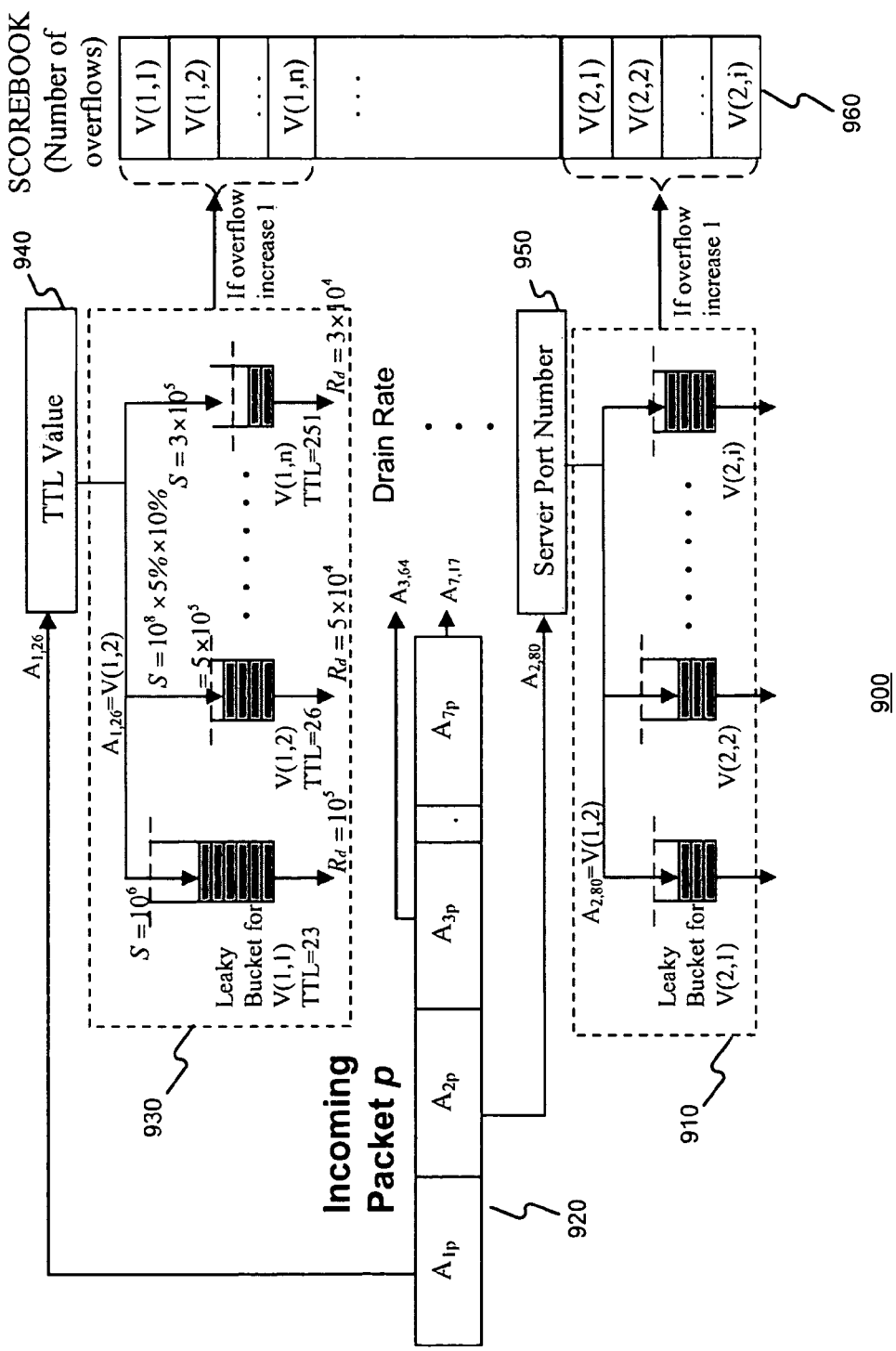
FIG. 9 illustrates profile measurement and scorebook generation based on the LB-based scheme consistent with the present invention.
Figure 12:
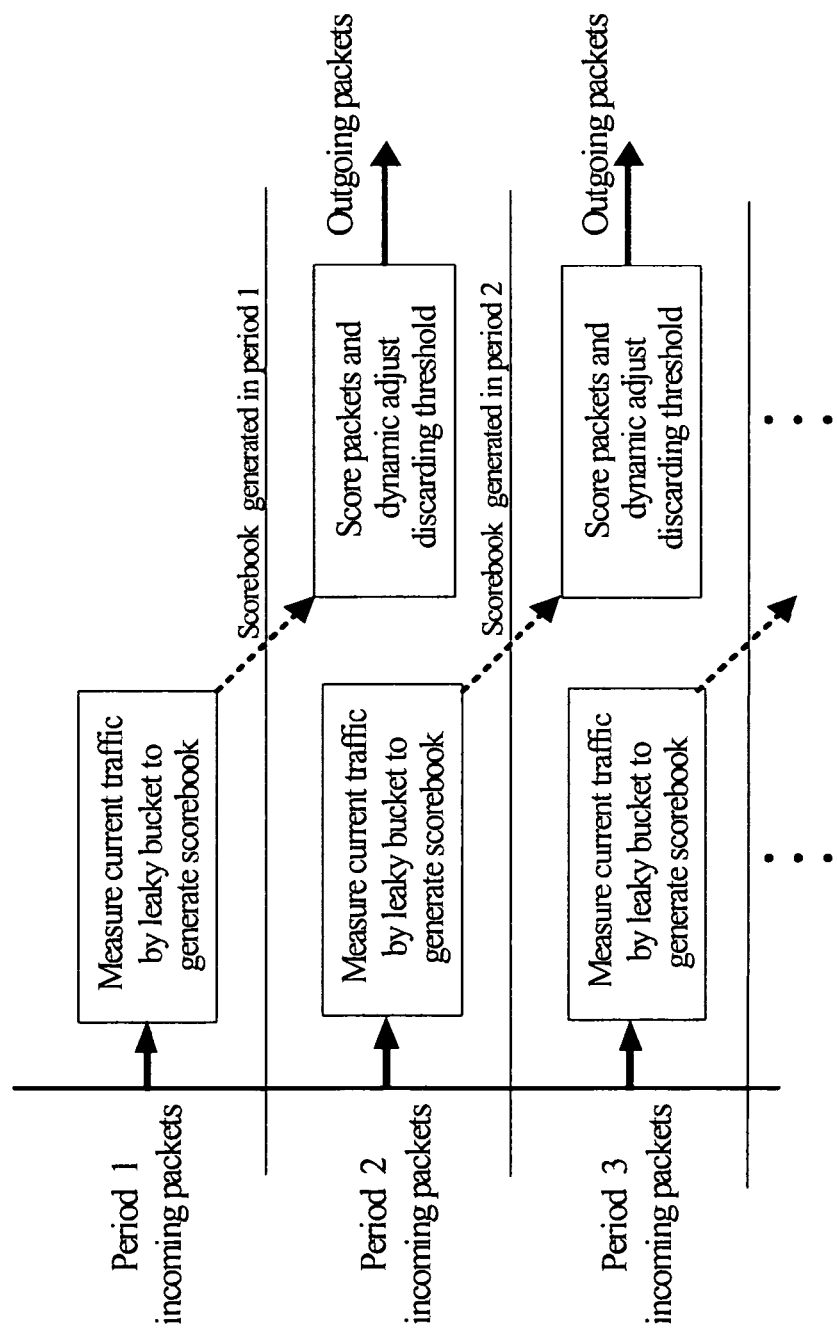
FIG. 12 illustrates a timeline pipelined implementation of the LB-based scheme in a manner consistent with the present invention.

To properly implement and integrate those processes, a pipelined approach implementation may be used, as shown in FIG. 12. The decision to allow or drop packets does not start until the third period starts. FIG. 9 also demonstrates the parallelization of the processes and the interdependency between periods. Although the packet scoring might always be performed, packet discarding must be performed only if the system is operating beyond its safe (target) utilization level $\rho_{target}$; otherwise all packets are forwarded.

Figure 13:
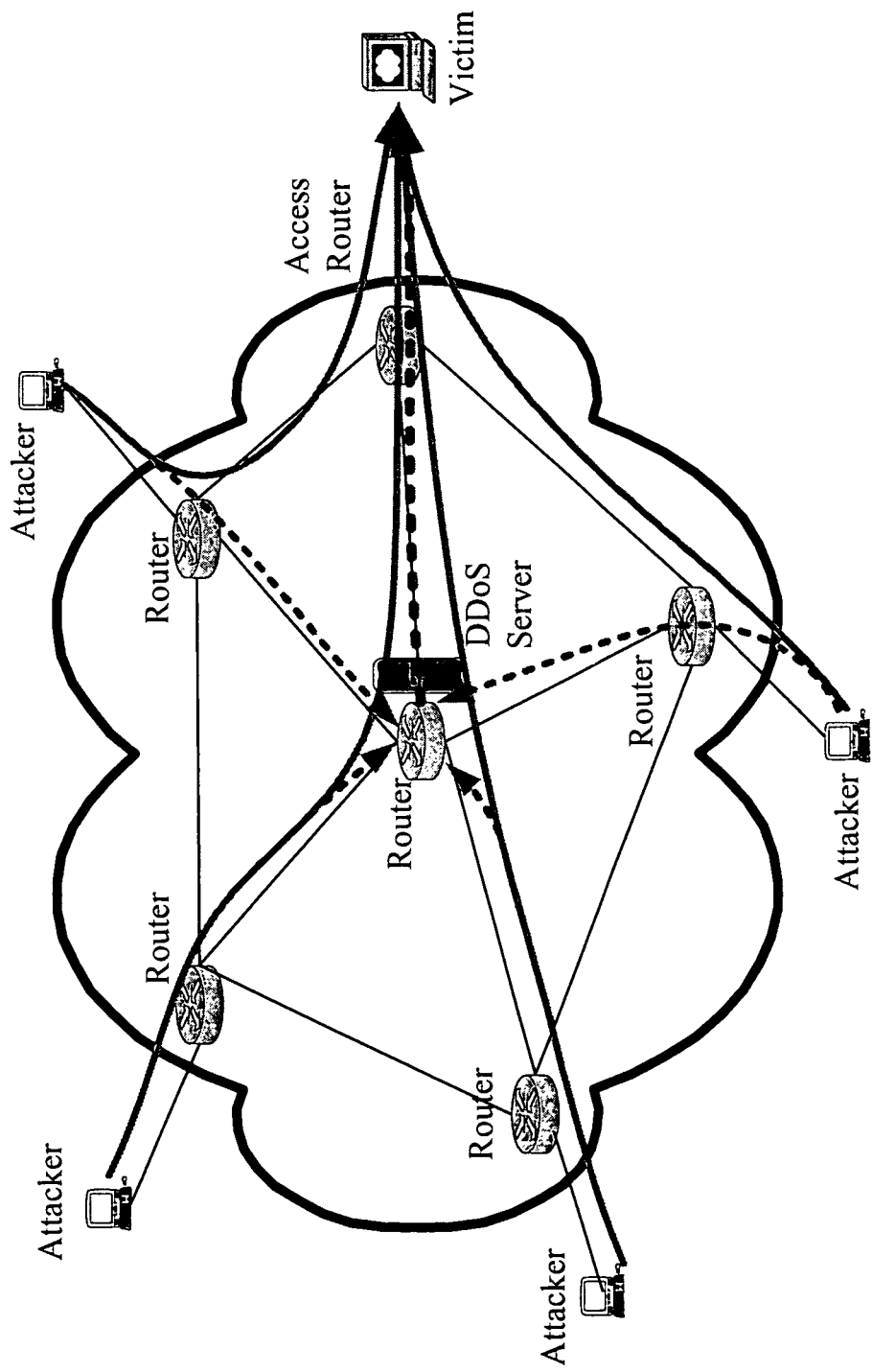
FIG. 13 illustrates a network utilizing the LB-based scheme deployed in a centralized manner for defending against DDoS attacks in a manner consistent with the present invention.

Overall, the exemplary LB-based scheme is faster and simpler than the CLP scheme, making it more suitable for real-time implementation. In the CLP scheme, there are too many interdependent tasks that need to be implemented sequentially before the packets can start to be dropped, such as iceberg identification and accounting, as per the two-stage pipelined approximation. In embodiments consistent with the present invention, these tasks can be all performed in a miniperiod of 100 ms or less, so the packet discarding and overload control can start immediately, thereby permitting faster responses to DDoS attacks LB-Based Scheme with Redirection The LB-based scheme is suitable for central deployment as shown in FIG. 13. The detect function might be deployed at the access router close to the protected target. The access router might continuously monitor the four key traffic statistics (packets-per-second, bits-per-second, number of active flows, and new arriving flow rate) for each target protected. If any of the four key traffic parameters is larger than a given threshold according to the nominal traffic profile, the access router might inform all other routers in the ISP to redirect the traffic going to the victim to the DDoS server.

The DDoS server uses the LB-based scheme to filter the attacking traffic from legitimate traffic and might use the P/I feedback controller to selectively discard packets and do overload control as described below. The traffic after filtering by the DDoS server is forwarding to the target by using, for instance, IPsec tunneling mode. Thus, the access router finds potentially suspicious traffic and instructs the access routers to redirect it to the DDoS Server. The DDoS Server can then perform a more thorough analysis of the traffic.

§4.2.3 Illustrative Example

Figure 8:
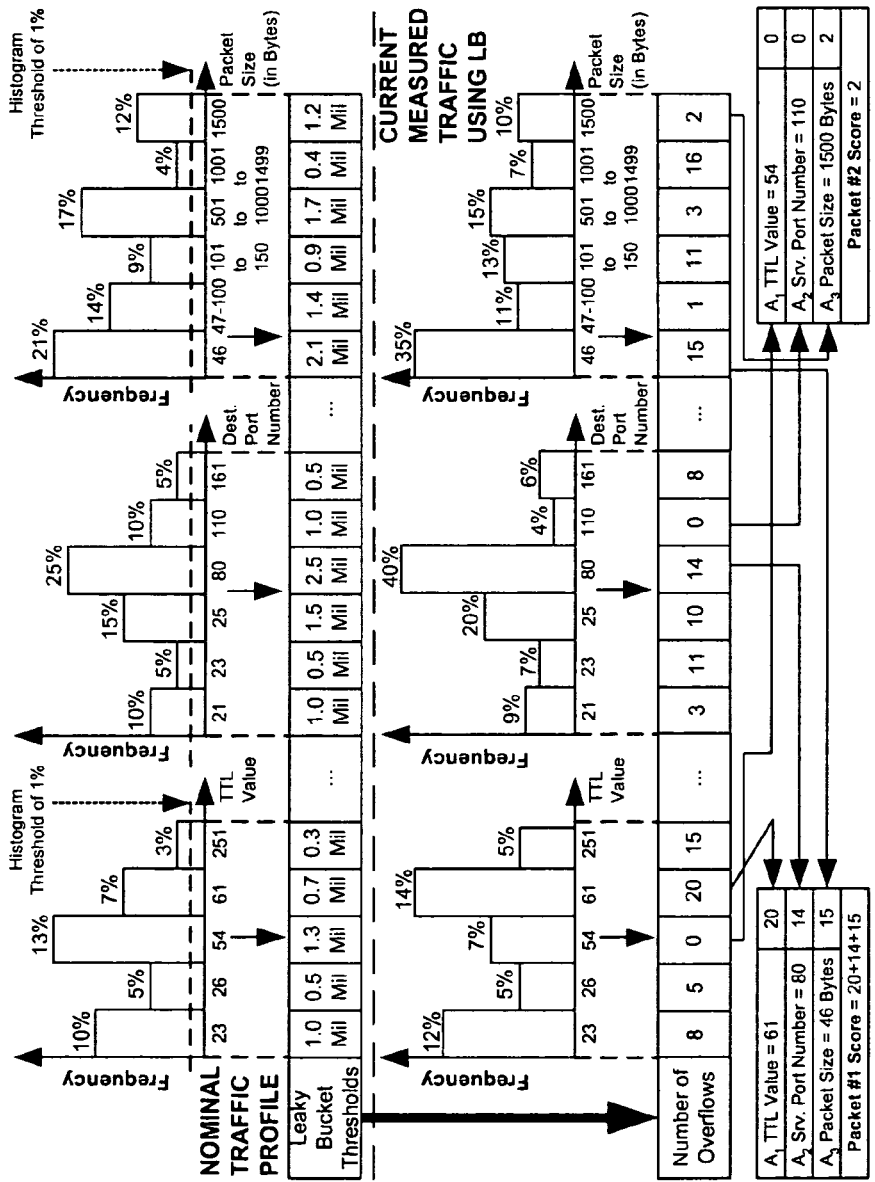
FIG. 8 illustrates nominal profile measurements in comparison with current measured traffic based on the LB packet scoring scheme consistent with the present invention.

FIG. 8 illustrates nominal profile measurements in comparison with current measured traffic based on an LB-based packet scoring scheme in a manner consistent with the present invention. Specifically, FIG. 8 shows an example to illustrate how the scores of packet #1 (on the bottom left of the figure) and packet #2 (on the bottom right) are obtained. There are two sets of histograms; the top three belong to normal traffic profile, and the bottom three belong to current traffic profile. The three histograms are associated with three attributes, TTL, destination port number, and packet size. Each histogram indicates the relative frequency of the attribute value that is larger than a given threshold (e.g., 1%). For instance, the relative frequency of TTL values of 23, 26, 54, 61, 251 are 10%, 5%, 13%, 7%, and 3%, respectively. Based on Eq. (1), the LB size S for each attribute value is calculated and listed below the top three histograms. For example, the LB size S of TTL value 23 is $10^6$ packets, where the relative frequency is 10%, N is $10^8$ packets and c is 10%.

The discrepancy between the histograms of the nominal traffic profile and those of the current traffic profile is reflected by the number of LB overflows, as shown below the bottom set of the histograms. For instance, the LB of TTL=61 overflows 20 times in the measurement period. In an actual system, the histograms of the current traffic profile are not required. They are shown here to facilitate the explanation.

A packet score is a sum of the partial scores of the attributes. The partial score is actually the number of overflows of the associated LB. For instance, packet #1's score, 49, is the sum of . . . 20, 14, and 15, while packet #2's score is 2. The higher the score is, the more the packets that share the same attribute value deviate from the nominal traffic, and thus the higher probability that these packets are attacking packet.

FIG. 9 illustrates how packet scores are calculated. Here, it is assumed that the value of N is $10^8$ packets, and the measurement interval is 10 seconds. FIG. 9 shows an incoming packet and its attributes: TTL=26, server-port-number=80, packet-size=64 bytes, and protocol-type=UDP. TTL information processing is described.

The LB size S associated with TTL=26 is set to 500,000, as calculated in FIG. 9, based on Eq. (1), and with given N, c, and f=5% (found on the TTL nominal traffic profile in FIG. 8). When the packet arrives, TTL=26 is identified as $A_1^P$, and the level of the LB corresponding to $A_{1,26}$ is increased by one. In the case of the new level being higher than the LB size S, the number of LB overflows for $A_{1,26}$ is also increased by one. A LB size for TTL and server port attributes are represented in FIG. 8. The number of overflows for the second TTL LB corresponding to TTL value 26 is represented by $V_{1,2}$ in FIG. 9 with the value of 5% in FIG. 8. This value is the partial score, or $V(A_1^P)$, for TTL=26.

Partial scores for the other attribute values are calculated similarly. Note that some LBs might be shared among different attribute vales. This is the case for $A_3$=64, for example, where $A_3$ represents the packet-size attribute (as in FIG. 8). As observed, all attribute values from 47 to 100 in FIG. 8 are associated to the same V(3, 2) LB read in the number of overflows of the second Leaky-Bucket of the third iceberg for the "packet-size" TCP/IP attribute.

One of the most notable differences between the LB-based approach and Y. Kim, W. C. Lau, M. C. Chuah, and H. J. Chao, "PacketScore: Statistics-based Overload Control against Distributed Denial of Service Attacks," *IEEE Infocom*, April 2004, is that construction of histograms for different attributes is no longer necessary when performing online measurement of the current traffic. Rather, histograms are only used when building the nominal profile, which is in turn used to set the LB's fixed parameters LB size S and $R_d$. Since the nominal profile can be determined offline it causes no impact to the real-time traffic collection operations.

Figure 10:
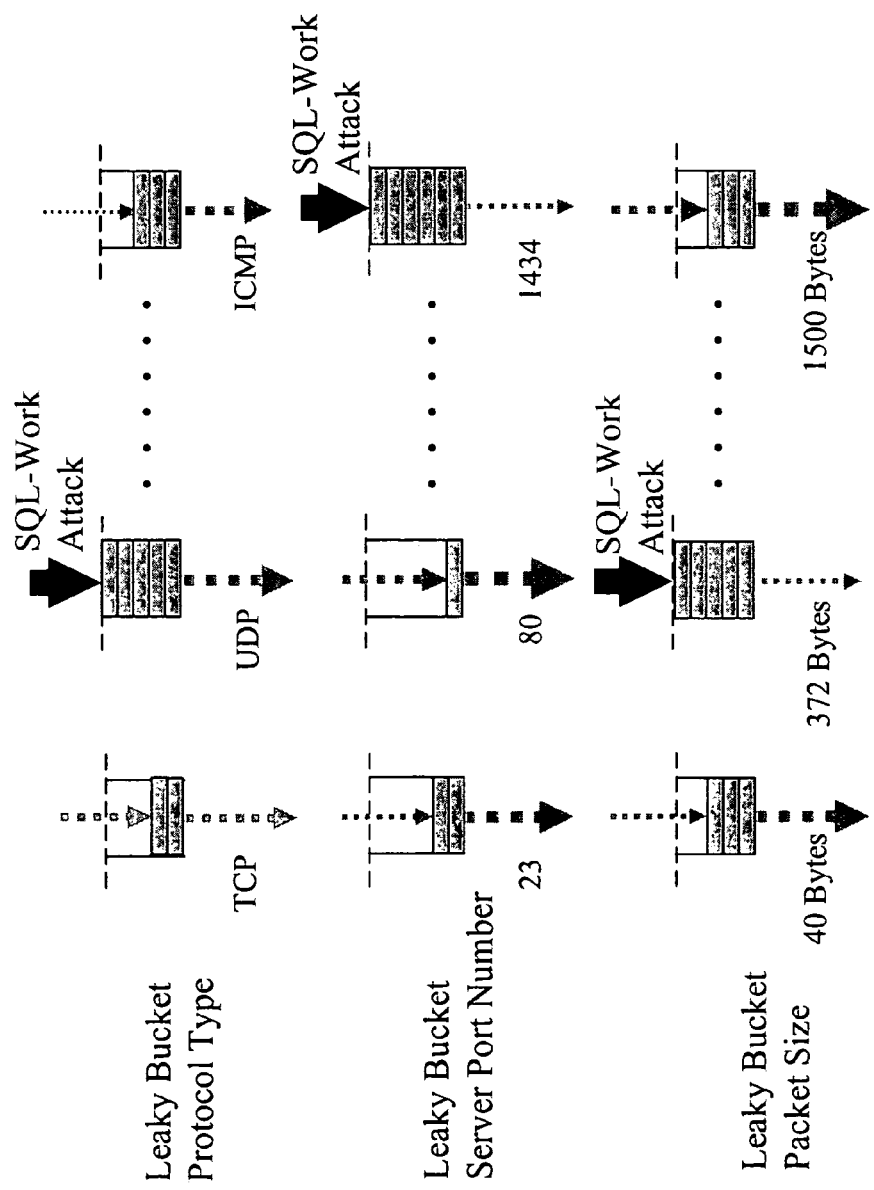
FIG. 10 illustrates how to detect an SQL-worm attack through scoring and differentiation by using the LB-based scheme consistent with the present invention.

FIG. 10 illustrates how to detect an SQL-Worm attack using LBs. The unusual flow of attacking packets rapidly increases the levels of the UDP Protocol, server port 1434, and packet size=372 bytes LBs, eventually causing their overflows, which leads to packet differentiation by score.

§4.3 Attribute-Value-Variation Scheme Consistent With a Second Embodiment of the Present Invention

§4.3.1 Exemplary Methods

Figure 4:
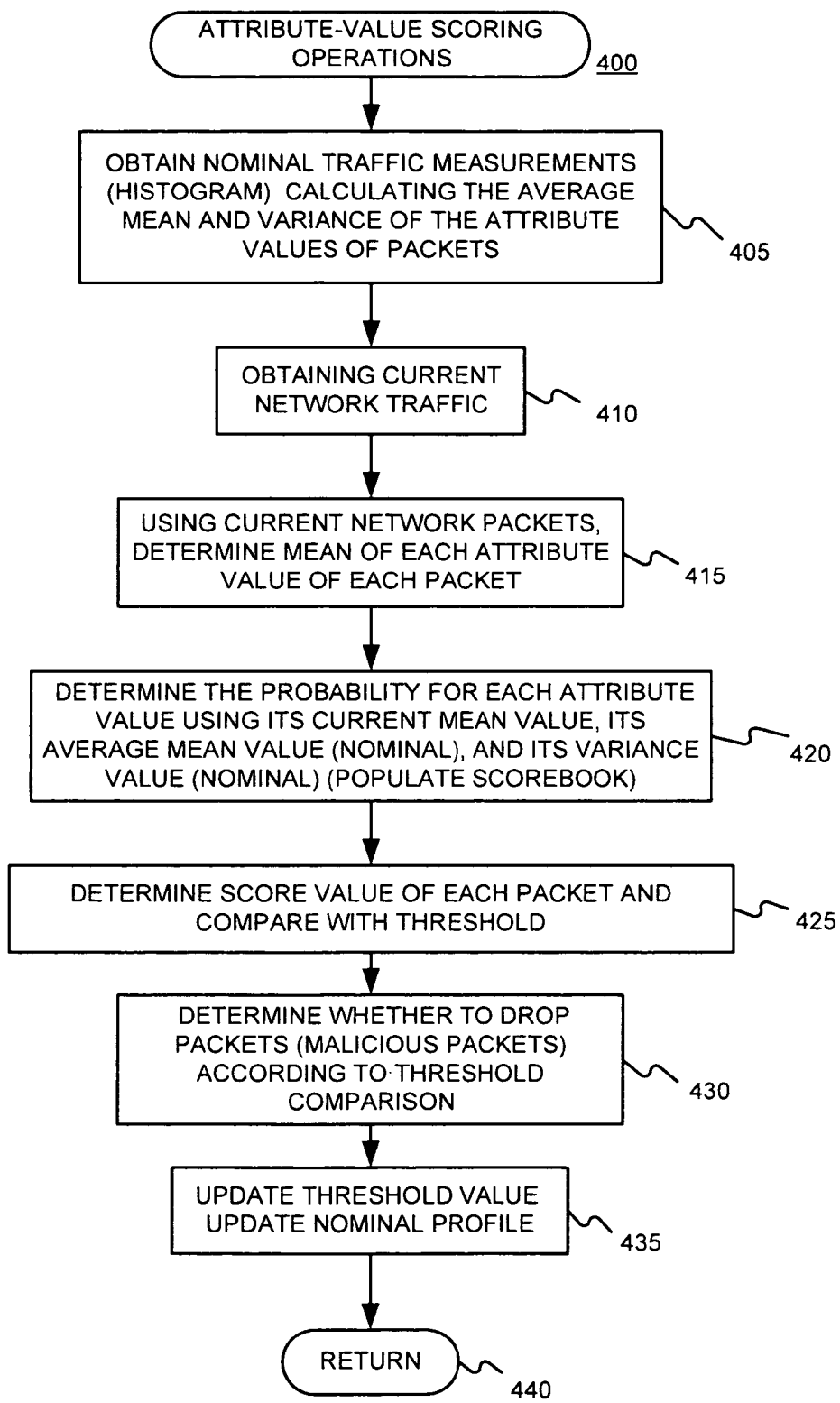
FIG. 4 is a flow diagram illustrating an exemplary method for discarding packets according to an attribute-value packet scoring scheme consistent with the present invention.

FIG. 4 is a flow diagram illustrating an exemplary method for discarding packets according to an attribute-value packet scoring scheme with the present invention. Specifically, the method 400 may obtain nominal traffic measurements (histograms) calculating the average mean and variance of the attribute values of packets. (Block 405) It 400 may also obtain the current network traffic profile information. (Block 410) The method 400 may use the current traffic profile to determine the probability for each attribute value based on the amount by which its average in current traffic deviates from its mean $\bar{\mu}$ in the nominal profile (Block 420). Subsequently, the method 400 may determine the score value of each packet and compare it with the system established threshold value. (Block 425) The method 400 may then proceed to determine whether or not to drop packets (e.g., whether or not they are deemed malicious) according to the threshold update the threshold. (Block 430) Finally, the method may update the threshold value and nominal profile if necessary (Block 435)

Referring back to block 405, the method 400 may construct nominal profile information (e.g., a histogram) for each attribute value of the packets. Specifically, the method 400 may calculate the average mean for each attribute value. The method 400 may divide the nominal profile period into a number of samples and calculate an attribute value mean for each sample. Subsequently the mean of these samples are calculated as the average mean. After the average mean of an attribute value is calculated, the method may proceed to calculate the associated variance of the attribute value. Both the average mean and variance are statistical values useful for the scoring and screening of packets.

Referring back to block 420, the method 400 may analyze the current network packets by determining the probability that, for each attribute value of each packet, its current mean value deviates more from its average mean (nominal) than its current attribute value. The sum of the probabilities of each attribute value of each packet represents the score value of packets. Therefore, the method 400 can calculate score values for every packet. Subsequently, the method 400 may determine whether to drop packets (e.g., those deemed malicious) by comparing their score values against the current system's threshold.

§4.3.2 Refinement and Alternatives

In this section, the attribute value variance is introduced as another metric that may be considered in the packet scoring process. The Attribute-Value-Variation (AV) scheme basically compares the incoming packet's attribute value distributions with the nominal profile and provides packet scores based on the resulting differentiation. It approximates the measured profile distributions and detects attribute values on arriving packets that significantly deviate from the nominal profile.

Scoring uses the probability of whether the packet's attribute-value distributions significantly differ from the nominal profile or not. This probability is determined using the comparison of the average means and variances of the iceberg-attribute-values computed in the nominal profile, with the incoming packet's current attribute-value mean distributions. The more the incoming packet's measured profile deviates from the nominal profile, the higher its likelihood of being an attacking one and vice-versa.

In the attribute value variation scheme, during the nominal profile calculation, the mean $\bar{\mu}$ and the variance $\sigma^2$ of the attribute value distribution are calculated. Since the DDoS attacker generates significant volume traffic to overwhelm the target, its attribute value distribution will deviate from nominal traffic profile. In a differentiating phase, the mean $\mu$ of each attribute value measured from current traffic and the deviation of it from the nominal one is quantified by Chebyshev inequality. The probability P of the event that the distance of the mean between current with nominal traffic profile is larger than $|\mu-\bar{\mu}|$ is calculated based on the Chebyshev inequality, as shown below:

$$P(|\chi - \bar{\mu}| > |\mu - \bar{\mu}|) \leq \frac{\sigma^2}{(\mu - \bar{\mu})^2} \tag{3}$$

This allows the scheme to obtain an upper bound on the probability that $\chi-\bar{\mu}$ exceeds a threshold $\mu-\bar{\mu}$, where $\chi$ is the variable of mean for a particular attribute value.

In the CLP-based approach, the viability is based on the premise that the legitimate traffic profile in the current traffic under DDoS attacks is similar to the nominal traffic profile. With more similarities between them, more accurate differentiation can be achieved. However, in general, the nominal traffic profile is a function of time which exhibits periodic variations as well as long term trend changes. Worse still, the legitimate traffic profile will be influenced by the congestion level of victim's access link under attack. For example, some legitimate traffic sensitive to transmission delay, e.g., web browse, will be depressed compared with the nominal traffic, when there is congestion to or from the victim. The AV-based schemes estimate the probability of a packet that is abnormal by using Chebyshev inequality to generate the scorebook. Unlike the CLP-based method which is sensitive to the change of the nominal traffic profile (since it only uses the statistic of mean $\bar{\mu}$), the AV-based schemes use not only the mean $\bar{\mu}$, but also the variance $\sigma^2$. In general, the relative frequency of packets' attribute value does not vary much as compared against the variance $\sigma^2$. Simulation results showed that an AV-based scheme has a more accurate differentiating result than a CLP-based method, in terms of false negatives and false positives.

The AV nominal profiles histograms might contain the average mean distribution $\bar{\mu}$, and variance $\sigma^2$ of the attribute values. The overall structure (except for the introduced variance field) and profile update scheme may be implemented in the same way as in the LB-based scheme, although the profile calculation is implemented differently. Here, the average mean for each attribute value is calculated—dividing the profile period into M=60 samples (A sample size of 60 gives a reasonable mean approximation, without adding too much overhead), with an attribute value mean calculated for each sample. The mean $\bar{\mu}_i$ of these samples becomes the total mean $\bar{\mu}$. The total mean $\bar{\mu}$ can be determined as:

$$\bar{\mu} = \frac{1}{M} \sum_{i=1}^{M} \bar{\mu}_i \tag{4}$$

and the variation $\sigma^2$ can be determined as:

$$\sigma^2 = \frac{1}{M} \sum_{i=1}^{M} (\overline{\mu}_i - \overline{\mu})^2 \tag{5}$$

Figure 14:
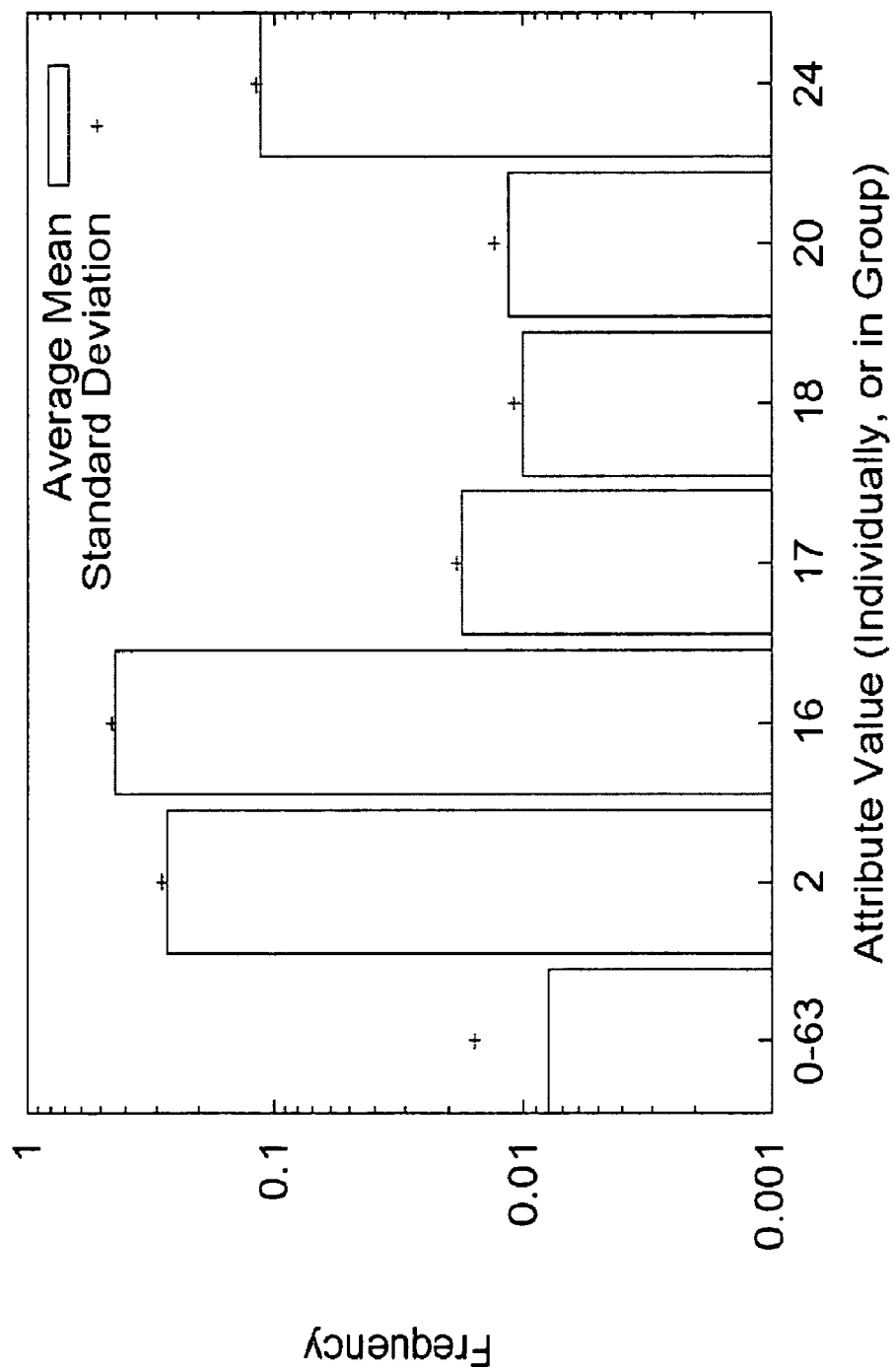
FIG. 14 illustrates a flag nominal profile on the attribute-value-variation-based scheme consistent with the present invention.

The scoring process measures these deviations, with higher deviations meaning higher likelihoods that the packets are malicious attacking packets. FIG. 14 shows the nominal profile used for the flag attribute, with the standard deviations of the attribute values on top of each average mean histogram bar. (Standard deviations are shown instead of variances, which are very low values, insignificant in the plot). Like the flag histogram in FIG. 11, FIG. 14 shows the nominal profile of AV-based scheme with mean and variance for MAWI traffic (the Internet trace archive of the MAWI project, http://tracer.csl.sony.co.jp/mawi/.

§4.3.3 Illustrative Example

The score of a packet is defined as the sum of the probabilities of its attribute value distributions deviating from their respective $\sigma^2$ and $\overline{\mu}$ in the nominal profiles. The probability P of each attribute value a is abnormal according to the nominal profile is, $$P(a) = \frac{\sigma^2}{(\mu - \overline{\mu})^2} \tag{6}$$

where $\mu$ is the average percentage associated with attribute value a in current traffic, $\overline{\mu}$ is the average percentage associated with a in the nominal profile and $\sigma^2$ is the variance of a in the nominal profile. If the mean of an attribute value in current traffic is less than the average in nominal traffic profile, that attribute value is automatically considered legitimate and assigned a probability of "1", since the sign of DDoS attacks is flooding a significant volume of traffic to overwhelm to link capacity.

Figure 15:
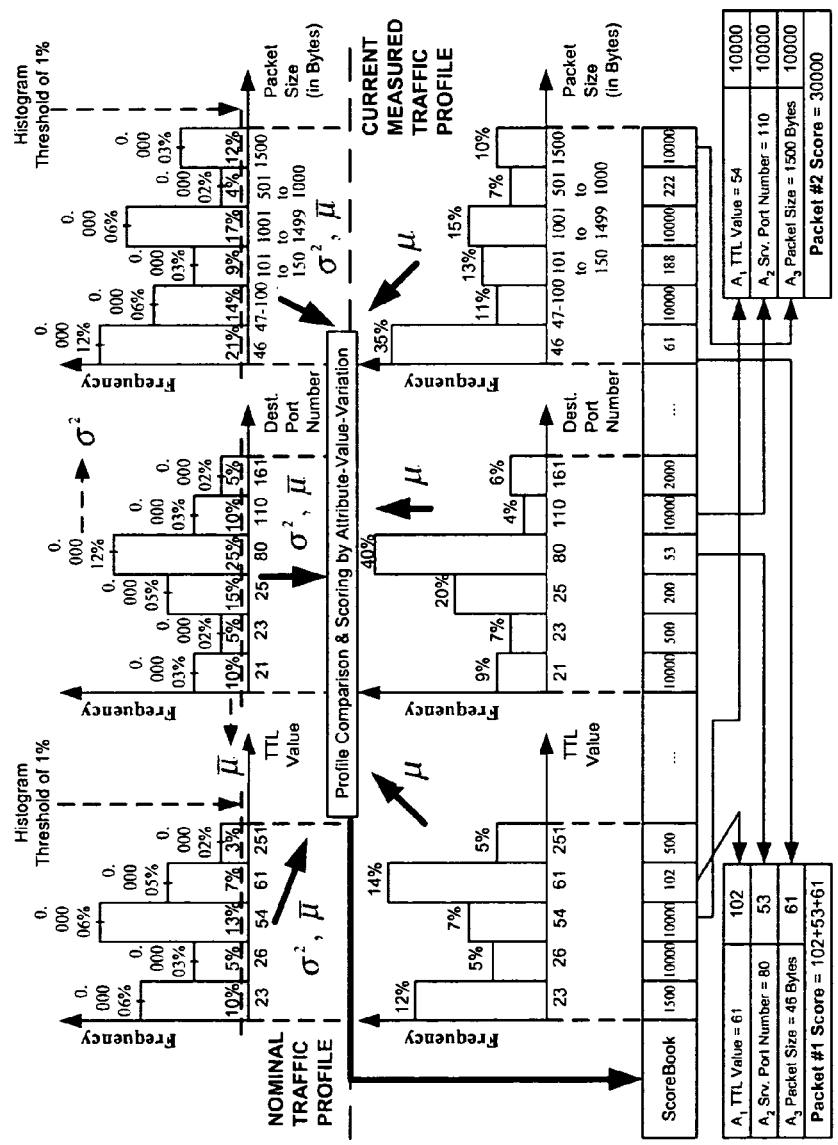
FIG. 15 illustrates nominal profile measurements in comparison with current measured traffic based on the AV-based packet scoring scheme consistent with the present invention

FIG. 15 illustrates how a packet's score is generated by an exemplary embodiment of the AV-based scheme. The histograms of nominal and current traffic profile in FIG. 15 are similar to those in the LB approach in FIG. 8. The difference is that each attribute value in FIG. 15 has both the average $\overline{\mu}$ and the variance $\sigma^2$ of relative frequency in nominal traffic profile, while only $\overline{\mu}$ is shown in FIG. 8. For example, the average $\overline{\mu}$ and the variance $\sigma^2$ of relative frequency for TTL value 23 is 10% and 0.00006%, respectively, which can be calculated from Equations (4) and (5) above. On the other hand, the histogram of the current traffic profile only has average $\mu$ of relative frequency. From Equation (6), a partial score for each attribute is generated and stored in a scorebook as shown in FIG. 15. For instance, TTL of 23 has $\overline{\mu}$=10% and $\sigma^2$=0.00006% in nominal traffic profile and $\mu$=12% in current traffic profile. The result of 0.15% is obtained from Equation (6). It can be normalized to 1500 by multiplying a constant value.

Figure 16:
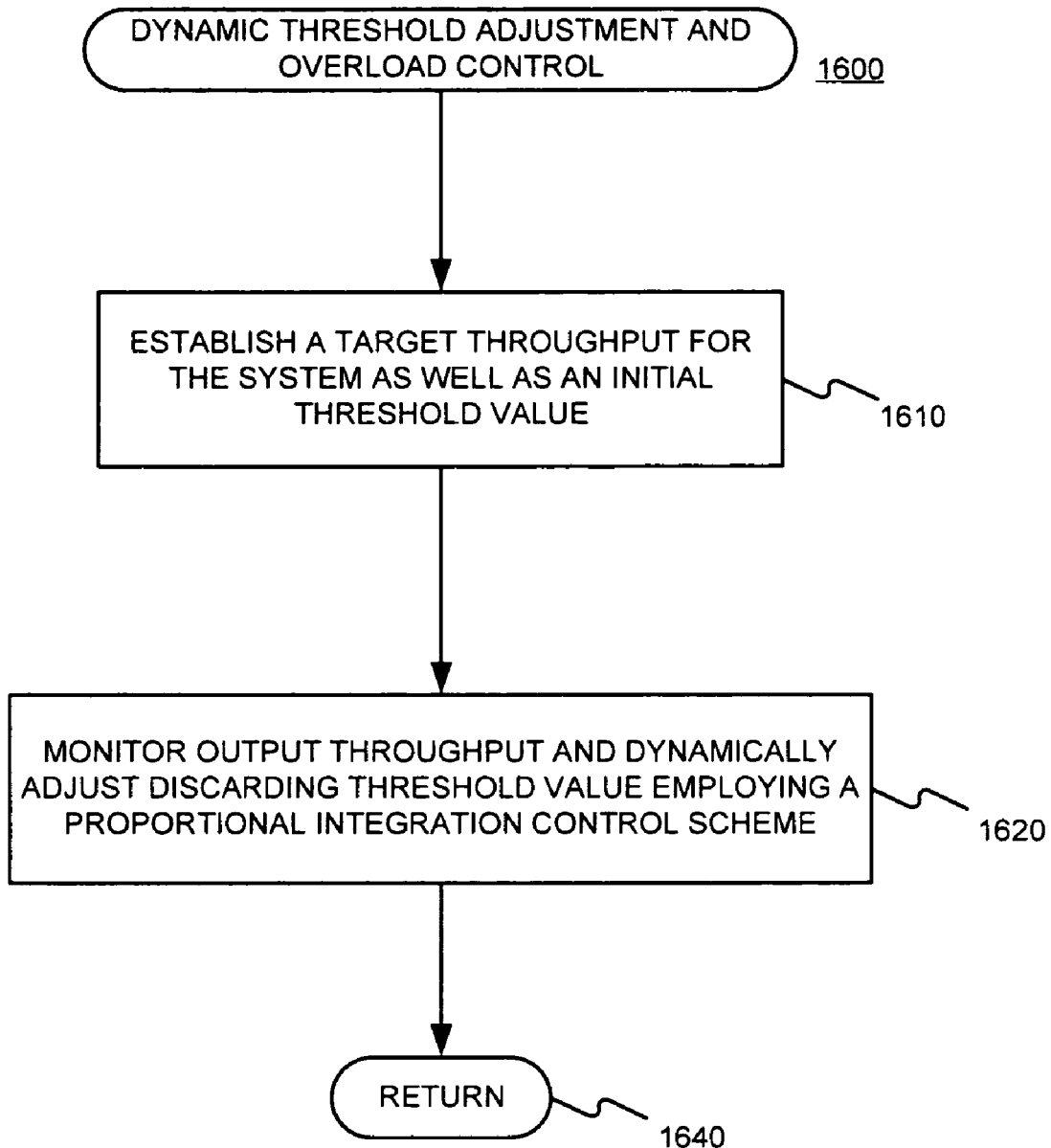
FIG. 16 is a flow diagram illustrating an exemplary method for performing dynamic threshold adjustment/overload control operations in a manner consistent with the present invention.

§4.4 Generating and Dynamically Updating a Discard Threshold Consistent with the Present Invention §4.4.1 Exemplary Methods FIG. 16 is a flow diagram illustrating an exemplary method 1600 for performing dynamic threshold adjustment/overload control operations in a manner consistent with the present invention. Specifically, the method 1600 may establish a target throughput for the system, as well as an initial threshold value. (Block 1610) Afterward, the method 1600 may proceed to monitor the output throughput and dynamically adjust the discarding threshold value employing a proportional integration control scheme. (Block 1620)

Referring back to block 1610, a target throughput must be established in order for the system to perform overload control. In particular, the target throughput might be estimated using measurements which are taken while the network is supposedly free of any attacks. The traffic characteristics/nature is observed and average throughput measurements may be taken. A target throughput rate may be set for the system using these average throughput measurements.

Referring back to block 1620, the method i 600 may dynamically adjust the discarding threshold value based on output throughput variations in the system. This threshold adjustment may be facilitated by using a proportionate integration control scheme. By using such a scheme, overload control and updating of the discarding threshold is substantially simplified over previous methods. Such a scheme is also more efficient and adaptable, and provides reliable control. A more comprehensive insight on how the overload control and dynamic threshold adjustment are applied in a proportionate control scheme is provided in the following section 4.42 below.

§4.4.2 Refinements and Alternatives

As just discussed above, overload control may be a very useful feature in an LB-based or AV-based scheme. Overload control may be implemented in the 3D-R, which continually tries to maintain a pre-set target throughput ($\rho_{target}$). This control might be achieved by forwarding or discarding the packets according to the $TH_d$. The Proportion Integration (P/I) controller may perform overload control in either LB-based or AV-based schemes, by providing and updating the THd dynamically as:

$$TH_d(k) = TH_d(k-1) + \Delta TH_d \tag{7}$$

where $$\Delta TH_d = K_p \cdot [e(k) - e(k-1)] + K_i \cdot e(k) \tag{8}$$

$K_p$ and $K_i$ are static values used in Equation (8). In simulations, the value of $10^{-6}$ was used for $K_p$; For $K_i$, $10^{-2}$ and $10^{-3}$ for LB and AV, respectively. The range of packet score was [0, 150,000]. The reason for a smaller $K_i$ for the AV scheme is that the P/I function is evoked more frequently (every 10 ms), as compared to the LB scheme (every 100 ms), requiring larger threshold variations per threshold update. All of these values were obtained in simulations during a learning period, in which many values were tested until the overload control produced good results. Continuing with Equation (7), $TH_d$ and error rate e are functions of a period k (and k−1), with the error rate being equal to the actual output throughput minus the target throughput as expressed below:

$$e(k) = \rho_{out}(k) - \rho_{target}(k) \tag{9}$$

§4.4.3 Illustrative Example

Figure 17:
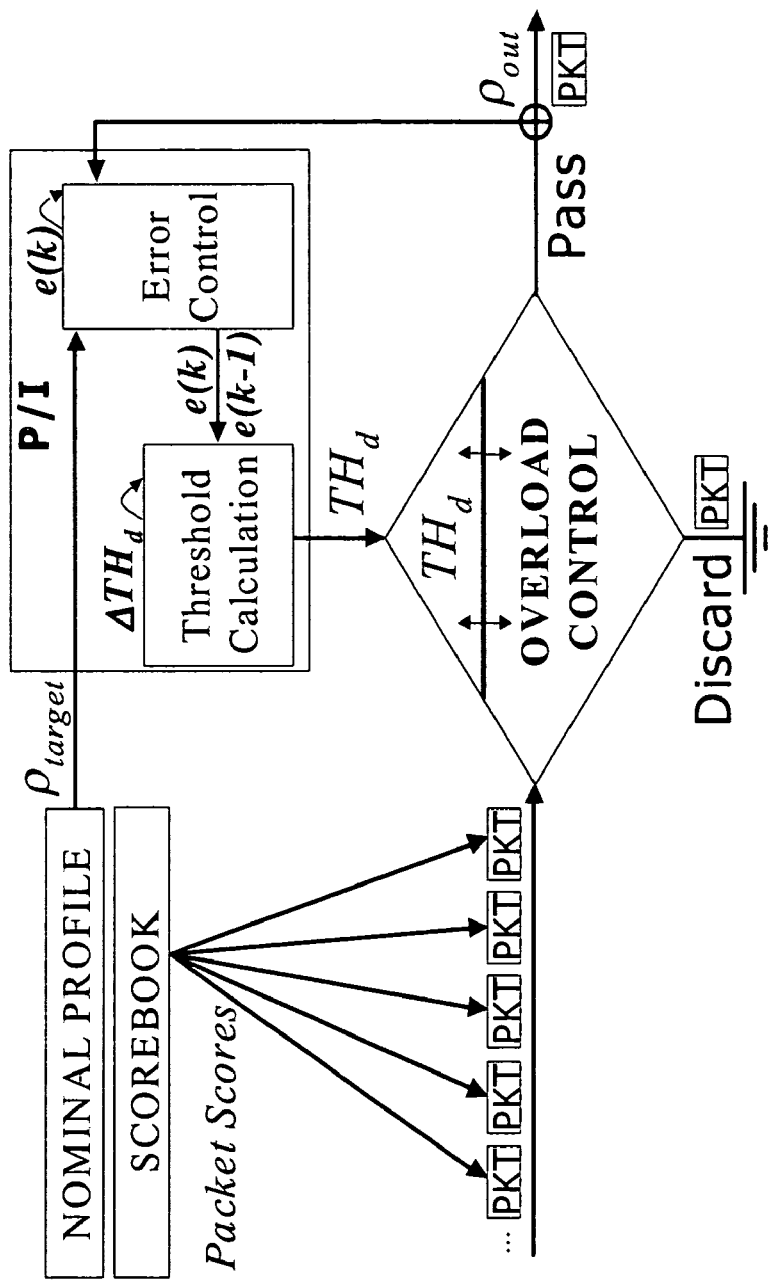
FIG. 17 is a block diagram illustrating the operations of the overload control/dynamic threshold adjustment in a manner consistent with the resent invention.

FIG. 17 depicts the integrated overload control operation involved in the $TH_d$ generation. First, the error rate e(k) is calculated by Equation (9), based on the difference of the actual output throughput $\rho_{out}$ and the target throughput $\rho_{target}$. Both e(k) and e(k−1) are calculated to get the discarding threshold variation $\Delta TH_d$. This variation is added to the previous period's threshold THd (k−1) to obtain the THd.

THd is simply a score threshold. Arriving packets are forwarded or dropped, if their scores are above or below it, respectively. This process of comparing packet scores to the current discarding threshold may be done at wire-speed, with the threshold concurrently adjusted (e.g., in every measurement period). These adjustments might occur at the time-scale (100 ms, in the LB-based scheme), which is larger than the packet arrival time-scale and shorter than the interval period of generating scorebook (e.g., 5 s). In the AV-based scheme, the adjustments may occur more frequently (every 10 ms) within the period the scorebook is generated. The shorter interval proved to be more efficient against fast-changing attacks, providing a better overload control.

The P/I scheme simplifies the overload control substantially, when compared to the CDF/load-shedding scheme (See e.g., S. Kasera, J. Pinheiro, C. Loader, M. Karaul, A. Hari, and T. LaPorta, "Fast and Robust Signaling Overload Control," *Proceedings of 9th International Conference on Network Protocols* (ICNP), November 2001), used in the CLP approach. Since CDF requires a load-shedding algorithm to determine a fraction ($\Phi$) of arriving suspicious packets that need to be discarded in order to control the victim's link capacity to below the available bandwidth. Once the packet-discarding percentage, $\Phi$, is determined, the corresponding packet score discarding threshold, $TH_d$, is determined from a CDF of the score value of all suspicious packets in the previous measurement interval. This CDF-based approach performs a complex calculation for sorting all packets' scores or generating the packets score histogram by two pass operations. The communication overhead for transmitting the CDF from each individual 3D-R to the DCS is much larger than a P/I control system consistent with the present invention.

§4.5 Exemplary Apparatus Consistent with the Present Invention

Figure 18:
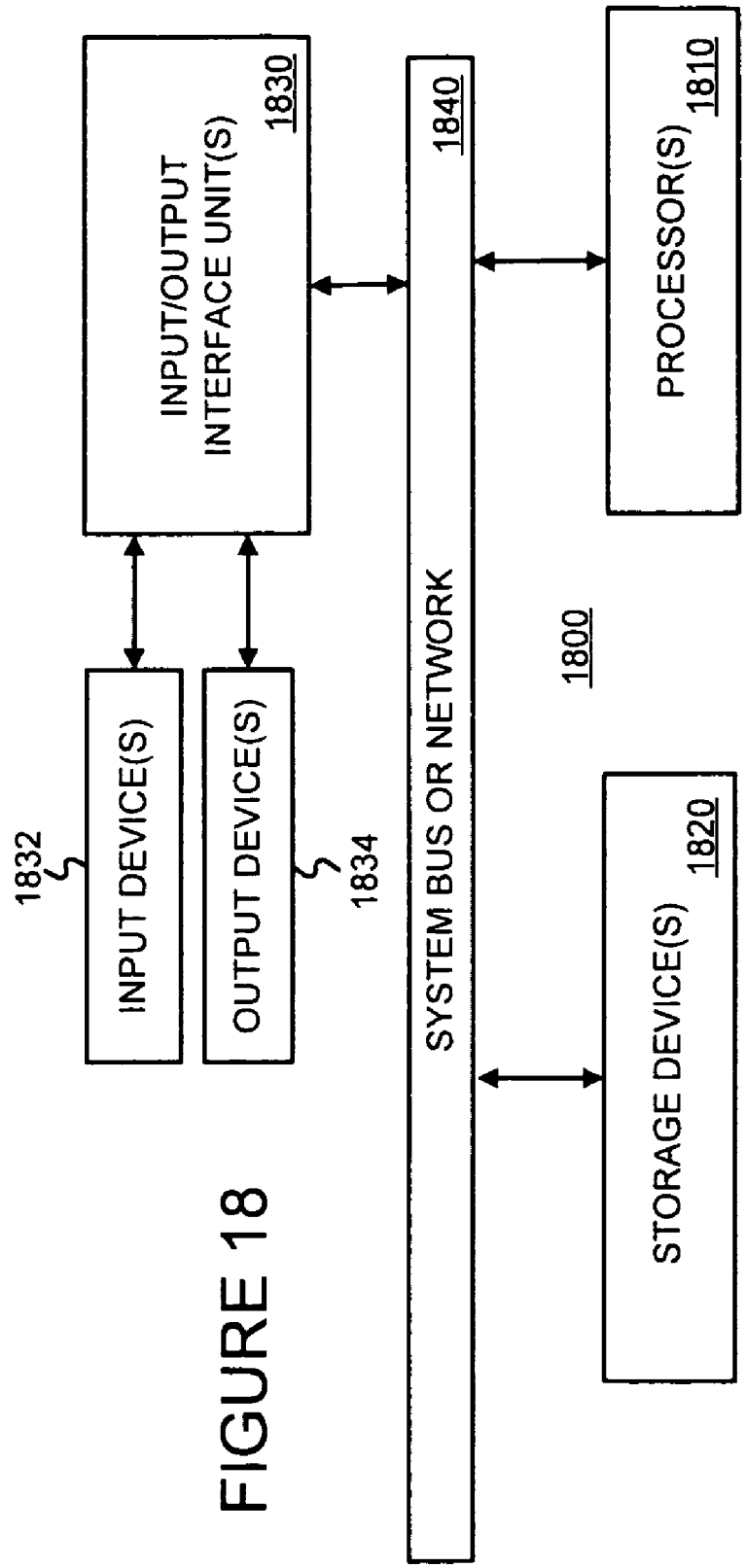
FIG. 18 is a block diagram of an exemplary apparatus that may perform various operations and store various information in a manner consistent with the present invention.

FIG. 18 is high-level block diagram of a machine 1800 that may perform one or more of the operations described above and store various information described above. The machine 1800 basically includes one or more processors 1810, one or more input/output interface units 1830, one or more storage devices 1820, and one or more system buses and/or networks 1840 for facilitating the communication of information among the coupled elements. One or more input devices 1832 and one or more output devices 1834 may be coupled with the one or more input/output interfaces 1830. The one or more processors 1810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1820 and/or may be received from an external source via one or more input interface units 1830.

In one embodiment, the machine 1800 may be one or more conventional personal computers. In this case, the processing units 1810 may be one or more microprocessors. The bus 1840 may include a system bus. The storage devices 1820 may include system memory, such as read only memory (ROM) and/or random access memory (RAM). The storage devices 1820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1810 through an appropriate interface 1830 coupled to the system bus 1840. The output devices 1834 may include a monitor or other type of display device, which may also be connected to the system bus 1840 via an appropriate interface. In addition to (or instead of) the monitor, the personal computer may include other (peripheral) output devices (not shown), such as speakers and printers for example.

Other components, such as hardware (e.g., integrated circuits such as ASICs, field programmable arrays etc.) may be used to implement one or more features of various embodiments consistent with the present invention.

§4.6 Conclusions

In view of the foregoing, at least some embodiments consistent with the present invention provide improved packet scoring schemes for use in determining malicious network activity (e.g., distributed denial-of-service (DDoS) attacks). At least some embodiments consistent with the present invention lower implementation complexity, increase DDoS detection and differentiation accuracies, and increase adaptability against complex DDoS attacks. Finally, at least some embodiments consistent with the present invention provide effective control even under fast-changing DDoS attacks.

What is claimed is:

1. A processor-implemented method comprising:
   a) determining, using a system including at least one processor, parameters of a leaky bucket using nominal communications traffic;
   b) applying, using the system, current communications traffic to the leaky bucket to measure the incoming traffic;
   c) tracking, using the system, a number of overflows of the leaky bucket due to the current communications traffic applied to the leaky bucket;
   d) scoring, using the system, the current traffic based on the tracked number of overflows of the leaky bucket for a given unit of time; and
   e) passing or dropping, using the system, traffic based on the score,
      wherein the act of passing or dropping traffic based on the score includes comparing the score to a threshold other than a size of the leaky bucket.

2. The processor-implemented method of claim 1 further comprising:
   dynamically adjusting, using the system, the threshold.

3. The processor-implemented method of claim 2 wherein dynamically adjusting the threshold includes:
   determining the threshold as:

$TH_d(k) = TH_d(k-1) + \Delta TH_d,$ where $\Delta TH_d = K_p * (e(k) - e(k-1)) + K_i * e(k)$
   $e(k) = \rho_{out}(k) - \rho_{target}(k)$
   $TH_d$ is the threshold,
   k is a measurement period,
   $\Delta TH_d$ is a threshold variation,
   $K_p$ and $K_i$ are static values,
   $e(k)$ is an error rate,
   $\rho_{out}(k)$ is actual throughput, and
   $\rho_{target}(k)$ is target throughput.

4. The processor-implemented method of claim 1 further comprising:
   determining, using the system, an initial value of the threshold based on a target throughput;
   monitoring, using the system, throughput; and
   dynamically adjusting, using the system, a value of the threshold based, at least in part, on the monitored throughput.

5. The processor-implemented method of claim 4 wherein the act of dynamically adjusting a value of the threshold employs a proportional integration control scheme.

6. A processor-implemented method comprising:
a) determining, using a system including at least one processor, average mean and variance of each of one or more attribute values of nominal communications traffic;
b) determining, using the system, a mean of each of the one or more attribute values of current communications traffic;
c) determining, using the system, a probability that for each of the one or more attributes, its current mean value deviates more from its average mean that its current attribute value;
d) scoring, using the system, the current traffic based on the determined probability or probabilities; and
e) passing or dropping, using the system, traffic based on the score.

7. The processor-implemented method of claim 6 wherein the act of passing or dropping traffic based on the score includes comparing the score to a threshold.

8. The processor-implemented method of claim 7 further comprising:
dynamically adjusting, using the system, the threshold.

9. The processor-implemented method of claim 8 wherein dynamically adjusting the threshold includes:
determining the threshold as:

$$TH_d(k)=TH_d(k-1)+\Delta TH_d,$$

where $\Delta TH_d = K_p * (e(k)-e(k-1)) + K_i * e(k)$
$e(k)=\rho_{out}(k)-\rho_{target}(k)$
$TH_d$ is the threshold,
k is a measurement period,
$\Delta TH_d$ is a threshold variation,
$K_p$ and $K_i$ are static values,
e(k) is an error rate,
$\rho_{out}(k)$ is actual throughput, and
$\rho_{target}(k)$ is target throughput.

10. The processor-implemented method of claim 7 further comprising:
determining, using the system, an initial value of the threshold based on a target throughput;
monitoring, using the system, throughput; and
dynamically adjusting, using the system, a value of the threshold based, at least in part, on the monitored throughput.

11. The processor-implemented method of claim 10 wherein the act of dynamically adjusting a value of the threshold employs a proportional integration control scheme.

12. The processor-implemented method of claim 6 wherein each of the at least one attribute is selected from a group of attributes consisting of (A) packet IP protocol-type values, (B) packet size, (C) packet Time-to-Live, (D) packet server port number, (E) packet source IP address prefix, (F) packet destination IP address prefix, (G) packet TCP/IP header length, and (H) packet TCP flag patterns.

13. An apparatus comprising:
a) at least one processor;
b) at least one input device; and
c) at least one storage device storing program instructions which, when executed by the at least one processor, performs a method including
i) determining parameters of a leaky bucket using nominal communications traffic,
ii) applying current communications traffic to the leaky bucket to measure the incoming traffic,
iii) tracking a number of overflows of the leaky bucket due to the current communications traffic applied to the leaky bucket,
iv) scoring the current traffic based on the tracked number of overflows of the leaky bucket for a given unit of time, and
v) passing or dropping traffic based on the score,
wherein the act of passing or dropping traffic based on the score includes comparing the score to a threshold other than a size of the leaky bucket.

14. The apparatus of claim 13 further comprising:
dynamically adjusting the threshold.

15. Apparatus comprising:
a) at least one processor;
b) at least one input device; and
c) at least one storage device storing program instructions which, when executed by the at least one processor, performs a method including:
i) determining average mean and variance of each of one or more attribute values of nominal communications traffic;
ii) determining a mean of each of the one or more attribute values of current communications traffic;
iii) determining a probability that for each of the one or more attributes, its current mean value deviates more from its average mean that its current attribute value;
iv) scoring the current traffic based on the determined probability or probabilities; and
v) passing or dropping traffic based on the score.

16. The apparatus of claim 15 wherein the act of passing or dropping traffic based on the score includes comparing the score to a threshold.

17. The apparatus of claim 16 wherein the method further includes:
dynamically adjusting the threshold.

18. A processor-implemented method comprising:
a) determining, using a system including at least one processor, parameters of a leaky bucket using nominal communications traffic;
b) applying, using the system, current communications traffic to the leaky bucket to measure the incoming traffic;
c) tracking, using the system, a number of overflows of the leaky bucket due to the current communications traffic applied to the leaky bucket;
d) scoring, using the system, the current traffic based on the tracked number of overflows of the leaky bucket for a given unit of time;
e) passing or dropping, using the system, traffic based on the score; and
f) dynamically adjusting the threshold to generate a dynamically adjusted threshold,
wherein the act of passing or dropping traffic based on the score includes comparing the score to the dynamically adjusted threshold.

19. A processor-implemented method comprising:
a) determining, using a system including at least one processor, parameters of a leaky bucket using nominal communications traffic;
b) applying, using the system, current communications traffic to the leaky bucket to measure the incoming traffic;
c) tracking, using the system, a number of overflows of the leaky bucket due to the current communications traffic applied to the leaky bucket;

d) scoring, using the system, the current traffic based on the tracked number of overflows of the leaky bucket for a given unit of time; and e) passing or dropping, using the system, traffic based on the score, wherein scoring the current traffic based on the tracked number of overflows of the leaky bucket includes:

determining one or more partial scores of a packet of the current traffic, wherein each of the one or more partial scores is a number of overflows of a leaky bucket associated with an attribute of the packet of the current traffic; and determining the score of the current traffic as a sum of all partial scores.

20. The processor-implemented method of claim 19 wherein the determined parameters of the leaky bucket include size and drain rate.

21. The processor-implemented method of claim 19 wherein the leaky bucket corresponds to at least one of (A) packet IP protocol-type values, (B) packet size, (C) packet Time-to-Live, (D) packet server port number, (E) packet source IP address prefix, (F) packet destination IP address prefix, (G) packet TCP/IP header length, and (H) packet TCP flag patterns.

22. The processor-implemented method of claim 19 wherein the acts of (c) tracking a number of overflows, if any, of the leaky bucket and (d) scoring the current traffic based on the tracked number of overflows of the leaky bucket for a given unit of time are pipelined such that they operate in parallel but on different packets.

23. The processor-implemented method of claim 19 wherein the leaky bucket does not shape or rate limit the current communications traffic applied to it.

\* \* \* \* \*